(12) United States Patent
Sun et al.

(10) Patent No.: US 11,844,054 B2
(45) Date of Patent: Dec. 12, 2023

(54) SOUNDING REFERENCE SIGNAL CONFIGURATION

(71) Applicant: Apple Inc., Cupertino, CA (US)

(72) Inventors: Haitong Sun, Cupertino, CA (US); Chunxuan Ye, San Diego, CA (US); Dawei Zhang, Saratoga, CA (US); Hong He, San Jose, CA (US); Jie Cui, San Jose, CA (US); Seyed Ali Akbar Fakoorian, San Diego, CA (US); Sigen Ye, Whitehouse Station, NJ (US); Wei Zeng, Saratoga, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 17/442,481

(22) PCT Filed: Apr. 3, 2021

(86) PCT No.: PCT/CN2021/085479
§ 371 (c)(1),
(2) Date: Sep. 23, 2021

(87) PCT Pub. No.: WO2022/205486
PCT Pub. Date: Oct. 6, 2022

(65) Prior Publication Data
US 2023/0117977 A1    Apr. 20, 2023

(51) Int. Cl.
*H04L 5/00* (2006.01)
*H04W 72/0453* (2023.01)
*H04W 72/231* (2023.01)

(52) U.S. Cl.
CPC ....... *H04W 72/0453* (2013.01); *H04L 5/0051* (2013.01); *H04L 5/0094* (2013.01); *H04W 72/231* (2023.01)

(58) Field of Classification Search
CPC ............ H04W 72/0453; H04W 72/231; H04L 5/0051; H04L 5/0094
See application file for complete search history.

(56) References Cited

U.S. PATENT DOCUMENTS

2020/0059384 A1      2/2020  Zhang et al.
2020/0235881 A1 *   7/2020  Choi .................... H04B 7/0695
2022/0085934 A1 *   3/2022  Choi .................... H04L 5/001

FOREIGN PATENT DOCUMENTS

CN         111480309         7/2020
CN         112438031         3/2021
WO    WO-2018232157 A1 *  12/2018  ........... H04B 17/336

OTHER PUBLICATIONS

Discussion on SRS Enhancement, R1-2101451, 3GPP TSG-RAN WG1 Meeting #104-e, Jan. 25-Feb. 5, 2021, 41 pages.
(Continued)

*Primary Examiner* — Omar J Ghowrwal
(74) *Attorney, Agent, or Firm* — Kilpatrick Townsend & Stockton LLP

(57) ABSTRACT

Provided is a method by a user equipment (UE), comprising: receiving one or more messages comprising sounding reference signal (SRS) configuration information from a based station (BS), the SRS configuration information comprises a partial frequency sounding indicator and additional information associated with the partial frequency sounding indicator, and determines SRS resource allocation; and sending a SRS to the BS in accordance with the SRS configuration information.

20 Claims, 16 Drawing Sheets

(56) References Cited

OTHER PUBLICATIONS

Enhancements on SRS Flexibility, Coverage and Capacity, R1-2008959, 3GPP TSG RAN WG1 #103-e, Oct. 26-Nov. 13, 2020, 10 pages.
Enhancements on SRS Flexibility, Coverage and Capacity, R1-2100042, 3GPP TSG RAN WG1 Meeting #104-e, Jan. 25-Feb. 5, 2021, 25 pages.
International Patent Application No. PCT/CN2021/085479, International Search Report and Written Opinion, dated Jan. 7, 2022, 10 pages.
3rd Generation Partnership Project; Technical Specification Group Radio Access Network; NR; Physical channels and modulation (Release 16), 3GPP TS 38.211 V16.5.0, Mar. 2021, 134 pages.
3rd Generation Partnership Project; Technical Specification Group Radio Access Network; NR; Physical Layer procedures for data (Release 16), 3GPP TS 38.214 V16.5.0, Mar. 2021, 171 pages.
3rd Generation Partnership Project; Technical Specification Group Access Network; NR; Radio Resource Control (RRC) protocol specification (Release 16), 3GPP TS 38.331 V16.4.1, Mar. 2021, 949 pages.
FL summary #1 on SRS enhancements, 3GPP TSG RAN WG1 Meeting #104-e, ZTE, R1-2101783, Jan. 27, 2021, 2021, 49 pages.

* cited by examiner

200

```
┌─────────────────────────────────────────────────────┐
│ RECEIVING ONE OR MORE MESSAGES COMPRISING SOUNDING  │
│ REFERENCE SIGNAL (SRS) CONFIGURATION INFORMATION FROM│     210
│ A BASED STATION (BS), THE SRS CONFIGURATION INFORMATION│
│ COMPRISES A PARTIAL FREQUENCY SOUNDING INDICATOR AND│
│ ADDITIONAL INFORMATION ASSOCIATED WITH THE PARTIAL  │
│ FREQUENCY SOUNDING INDICATOR, AND DETERMINES SRS    │
│ RESOURCE ALLOCATION                                 │
└─────────────────────────────────────────────────────┘
                          │
                          ▼
┌─────────────────────────────────────────────────────┐
│ SENDING A SRS TO THE BS IN ACCORDANCE WITH THE SRS  │     220
│ CONFIGURATION INFORMATION                           │
└─────────────────────────────────────────────────────┘
```

┌─────────────────────────────────────────────────────────────┐
│ SENDING ONE OR MORE MESSAGES COMPRISING SOUNDING            │
│ REFERENCE SIGNAL (SRS) CONFIGURATION INFORMATION TO A       │
│ USER EQUIPMENT (UE), THE SRS CONFIGURATION INFORMATION      │ — 910
│ COMPRISES A PARTIAL FREQUENCY SOUNDING INDICATOR AND        │
│ ADDITIONAL INFORMATION ASSOCIATED WITH THE PARTIAL          │
│ FREQUENCY SOUNDING INDICATOR, AND DETERMINES SRS            │
│ RESOURCE ALLOCATION                                         │
└─────────────────────────────────────────────────────────────┘
                                │
                                ▼
┌─────────────────────────────────────────────────────────────┐
│ RECEIVING A SRS FROM THE UE IN ACCORDANCE WITH THE SRS      │ — 920
│ CONFIGURATION INFORMATION                                   │
└─────────────────────────────────────────────────────────────┘

SOUNDING REFERENCE SIGNAL CONFIGURATION

CROSS-REFERENCE TO RELATED APPLICATIONS

This application is a U.S. National Phase of PCT/CN2021/085479, filed Apr. 3, 2021, the disclosure of which is herein incorporated by reference in its entirety for all purposes.

TECHNICAL FIELD

This disclosure relates generally to wireless communication systems, and more specifically to Sounding Reference Signal (SRS) configuration.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE), fifth-generation (5G) 3GPP new radio (NR) standard, the Institute of Electrical and Electronics Engineers (IEEE) 802.16 standard, which is commonly known to industry groups as worldwide interoperability for microwave access (WiMAX®); and the IEEE 802.11 standard for wireless local area networks (WLAN), which is commonly known to industry groups as Wi-Fi®. In 3GPP radio access networks (RANs) n LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs. RAN Nodes can include a 5G Node, new radio (NR) node or g Node B (gNB), which communicate with a wireless communication device, also known as user equipment (UE).

SUMMARY

According to an aspect of the present disclosure, a method by a user equipment (UE) is provided that comprises receiving one or more messages comprising sounding reference signal (SRS) configuration information from a base station (BS), the SRS configuration information comprises a partial frequency sounding indicator and additional information associated with the partial frequency sounding indicator, and determines SRS resource allocation; and sending a SRS to the BS in accordance with the SRS configuration information.

According to an aspect of the present disclosure, a method by a base station (BS) is provided that comprises sending one or more messages comprising sounding reference signal (SRS) configuration information to a user equipment (UE), the SRS configuration information comprises a partial frequency sounding indicator and additional information associated with the partial frequency sounding indicator, and determines SRS resource allocation; and receiving a SRS from the UE in accordance with the SRS configuration information.

According to an aspect of the present disclosure, an apparatus for a user equipment (UE), the apparatus comprises one or more processors configured to perform steps of the method according to any of methods by the UE provided herein.

According to an aspect of the present disclosure, an apparatus for a base station (BS), the apparatus comprises one or more processors configured to perform steps of the method according to any of methods by the BS provided herein.

According to an aspect of the present disclosure, a computer readable medium having computer programs stored thereon which, when executed by one or more processors, cause an apparatus to perform steps of the method according to any of methods provided herein.

According to an aspect of the present disclosure, an apparatus for a communication device, comprising means for performing steps of the method according to any of methods provided herein.

According to an aspect of the present disclosure, a computer program product comprising computer programs which, when executed by one or more processors, cause an apparatus to perform steps of the method according to any of methods provided herein.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 2 illustrates a flowchart for an exemplary method by a UE.

FIG. 9 illustrates a flowchart for an exemplary method by a BS.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

Sounding Reference Signal (SRS) is uplink (UL) reference signal which is transmitted by UE to BS. SRS can only be transmitted in the last 6 symbols of each slot in Rel-15. In Rel-16, SRS can be transmitted in any symbol for NR-U and NR positioning.

Figure 1:
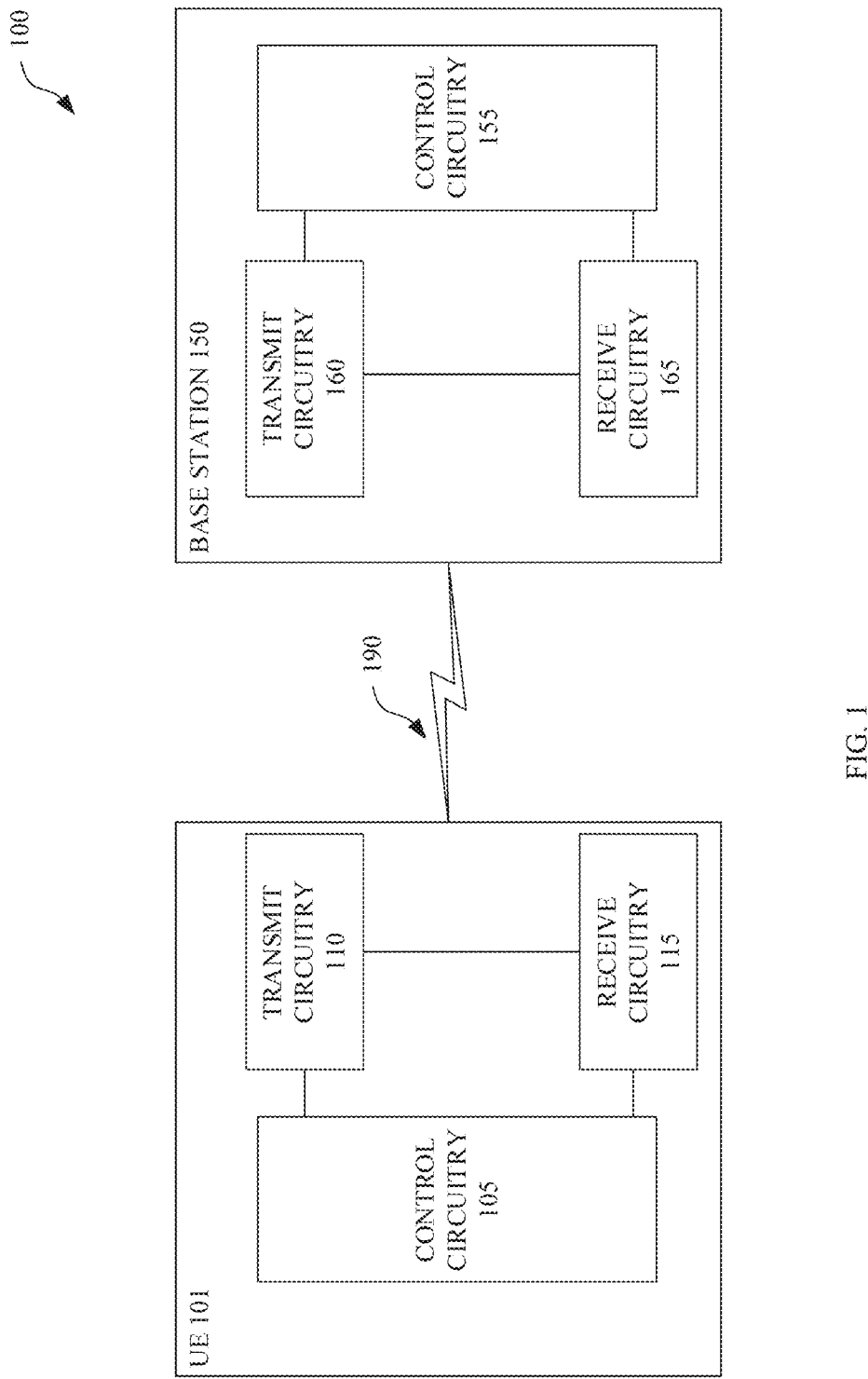
FIG. 1 is a block diagram of a system including a base station (BS) and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 19) in a base station service area provided by the base station 150. In some embodiments, such a broader network may be a wide area network operated by a cellular network provider, or may be the Internet Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120 degree area with an array of antennas directed to each sector to provide 360 degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g. messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person to person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink super-frame that is comprised of a plurality of downlink subframes.

Within the narrow system bandwidth, the receive circuitry 165 may receive a plurality of multiplexed uplink physical channels. The plurality of uplink physical channels may be multiplexed according to TDM or FDM The receive circuitry 165 may receive the plurality of multiplexed uplink physical channels in an uplink super-frame that is comprised of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuity 110 may transmit copies of the same data multiple times and the receive circuitry 115 may receive multiple copies of the same data multiple times.

FIG. 2 illustrates a flowchart for an exemplary method 200 by a UE. As shown in FIG. 2, a method 200 by a UE may comprise step 210 to 220.

In step 210, LIE receiving one or more messages comprising sounding reference signal (SRS) configuration information from a base station (BS). The SRS configuration information comprises a partial frequency sounding indicator and additional information associated with the partial frequency sounding indicator, and determines SRS resource allocation. Exemplarily, the partial frequency sounding indicator can be represented by $P_F$.

In step 220. UE sending an SRS to the BS in accordance with the SRS configuration information.

In some embodiments, UE may receive signaling comprising SRS configuration information from BS. Exemplarily, the message or signaling may be Radio Resource Control (RRC).

Figure 3:
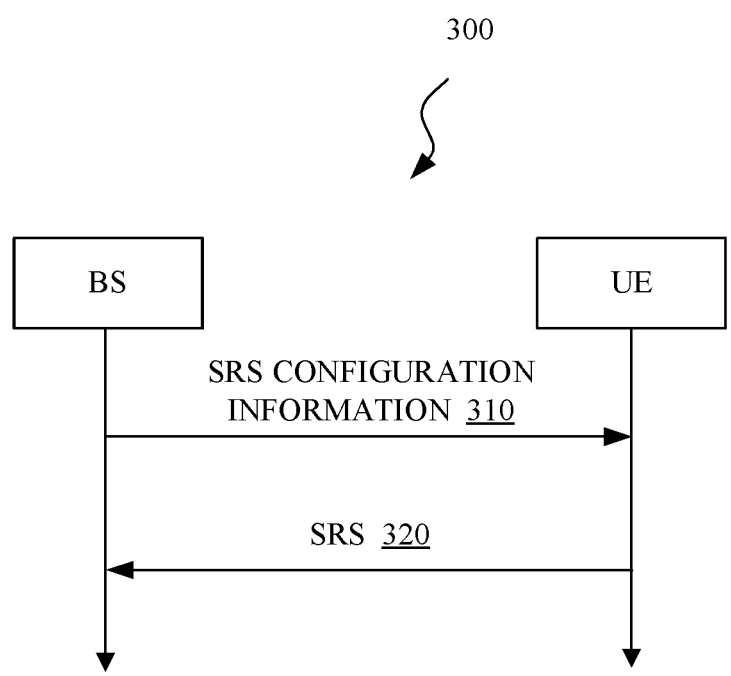
FIG. 3 illustrates an exemplary transmit scenario with the Sounding Reference Signal (SRS) configuration information in accordance with some embodiments.

FIG. 3 illustrates an exemplary transmit scenario 30) with the SRS configuration information in accordance with some embodiments. As shown in FIG. 3, BS sending and UE receiving, one or more messages containing SRS configuration information 310. The SRS configuration information 310 comprises a partial frequency sounding indicator $P_F$ and additional information associated with the partial frequency sounding indicator. An SRS resource allocation is determined by the SRS configuration information 310. In some embodiments, the SRS resource allocation indicates, in according with the SRS configuration information 310, the time and frequency resources that BS allocates to UE for the SRS transmission. UE transmits SRS 320 to BS based on the time and frequency resources allocated for the transmission.

In some embodiments, a partial frequency sounding indicator $P_F$ may configure a subband of SRS transmission into one or more segments. In some embodiments, SRS transmission subband may be configured in accordance with Table 6.4.1.4.3-1 in 38.211. A c-SRS in SRS-Resource configures the row index into the table, i.e., $C_{SRS}$, and a b-SRS in SRS-Resource configures the column index into the table, i.e., $B_{SRS}$. The corresponding $m_{SRS,B_{SRS}}$ determines the SRS transmission subband size.

In some embodiment, additional information associated with the partial frequency sounding indicator may include a subband size of an SRS transmission $m_{SRS,B_{SRS}}$ and the $m_{SRS,B_{SRS}}$ and the partial frequency sounding indicator determine a group of contiguous resource blocks (RBs) of the SRS transmission in a symbol in a first slot. Exemplarily, a symbol may be an orthogonal frequency division multiplexing (OFDM) symbol.

In some embodiments, an SRS transmission subband with $m_{SRS,B_{SRS}}$ resource blocks (PRBs) may be divided into multiple groups of RBs and each group is constructed by $m_{SRS,B_{SRS}}/P_F$ contiguous RBs in an OFDM symbol in a time slot. In some variants, when SRS transmission subbands is divided into multiple groups by $P_F$, each UE can be configured with different group in order to multiplex more UEs in the same resources. Optionally, the value of $P_F$ may be selected among {2, 3, 4, 8}.

In some implementations, additional information may further comprise a partial frequency sounding offset and an offset basic unit of the partial frequency sounding offset, and the offset basic unit and the partial frequency sounding offset determine a shift of the group of contiguous RBs in the subband of the SRS transmission in the first slot.

In some embodiments, the partial frequency sounding offset may be determined by $P_F$ and is an integer selected from 0, 1, . . . , $P_F$−1.

An offset basic unit of the partial frequency sounding offset defines the number of RBs shifted per partial frequency sounding offset. In some embodiments, the offset basic unit may be specified in the specification, for example, in 38.214 or 38.331 Alternatively, the offset basic unit may be configured as part of RRC, for example, in SRS-Resource, SRS-ResourceSet or SRS-Config.

In some embodiments, the number of RBs shifted by the offset basic unit equals to the number of RBs in the group of the contiguous RBs or equals to a constant value that is determined by a maximum value allowed for the partial frequency sounding indicator.

Figure 4A:
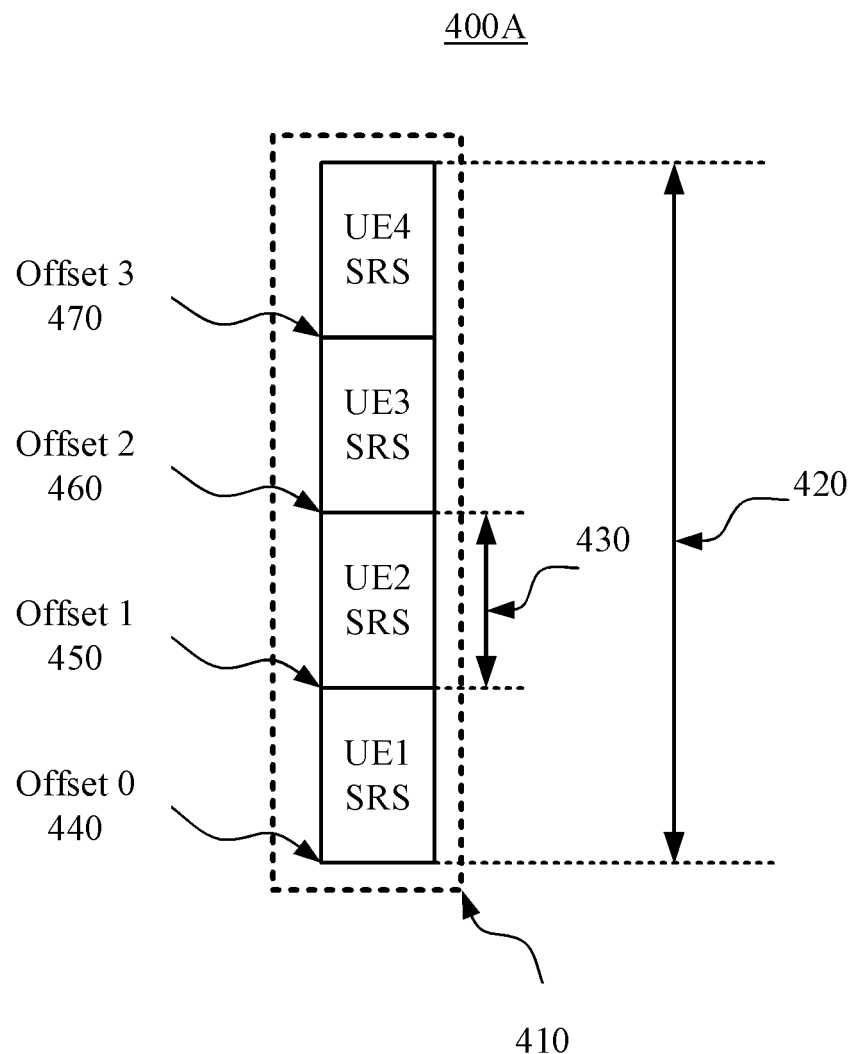
FIG. 4A illustrates an exemplary SRS configuration with the offset in accordance with some embodiments.

FIG. 4A illustrates an exemplary SRS configuration 400A with the partial frequency sounding offset in accordance with some embodiments.

Referring to FIG. 4A, an SRS may be transmitted in the SRS subband 410 in one OFDM symbol in a first slot. In some embodiments, the subband size 420 of SRS subband 410 is $m_{SRS,B_{SRS}}$. For example, the subband size 420 may be 4 RBs. i.e., $m_{SRS,B_{SRS}}$=4 RBs. Optionally, the subband size 420 may be any multiple of 4 RBs.

In some embodiments, the partial frequency sounding indicator $P_F$ may be configured to indicate the group of contiguous RBs 430 for the SRS transmission. The group of contiguous RBs 430 may have $m_{SRS,B_{SRS}}/P_F$ RBs.

In FIG. 4A, the offset basic unit is configured to shift $m_{SRS,B_{SRS}}/P_F$ contiguous RBs per partial frequency sounding offset. In some embodiment, each UE only transmit SRS in one group of contiguous RBs, for example the group 430. The SRS subband 410 is able to allocate multiple UEs, for example UE1-UE4, to transmit SRS based on the partial frequency sounding offsets 440-470. In some implementation, partial frequency sounding offset 440 equals to 0, 450 equals to 1, 460 equals to 2 and 470 equals to 3, respectively. Thus, the contiguous RBs shifted by partial frequency sounding offset 440 is 0 RBs. The contiguous RBs shifted by partial frequency sounding offset 450 is $m_{SRS,B_{SRS}}/P_F$ contiguous RBs. The contiguous RBs shifted by partial frequency sounding offset 460 is $2m_{SRS,B_{SRS}}/P_F$ contiguous RBs. The contiguous RBs shifted by partial frequency sounding offset 470 is $3m_{SRS,B_{SRS}}/P_F$ contiguous RBs.

Figure 4B:
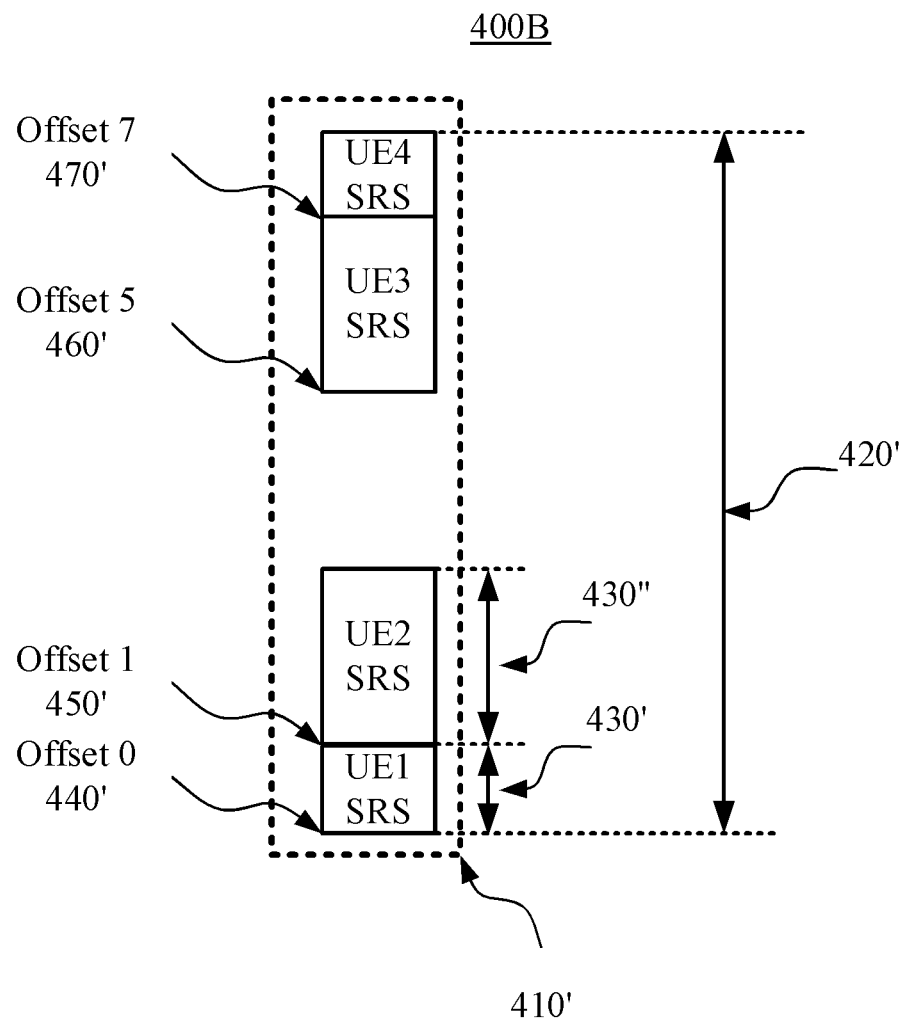
FIG. 4B illustrates another exemplary SRS configuration with another offset in accordance with some embodiments.

FIG. 4B illustrates another exemplary SRS configuration 400B with another offset in accordance with some embodiments. Referring to FIG. 4B, similar reference numerals denote similar components and will not be repeated here.

In some embodiments, the number of RBs shifted by the offset basic unit equals to a constant value that is determined by a maximum value allowed for the partial frequency sounding indicator $P_F$. Exemplarily, when $P_F$ select value from {2, 3, 4, 8}, the maximum value allowed for $P_F$ is 8. Accordingly, in some embodiments as shown in FIG. 4B, the number of RBs shifted by the offset basic unit is $m_{SRS,B_{SRS}}/8$.

As shown in FIG. 4B, the group of contiguous RBs 430' for UE1 have $m_{SRS,B_{SRS}}/8$ RBs. i.e. $P^F$=8 for UE1 Another group of contiguous RBs 430'' for UE2 have $m_{SRS,B_{SRS}}/4$ RBs, i.e. $P_F$=4 for UE2. The partial frequency sounding offset 440', 450', 460', 470', are 0, 1, 5, 7, respectively. The offset basic unit is $m_{SRS,B_{SRS}}/8$. Accordingly, the SRS transmission of each UE shifted by each partial frequency sounding offset are 0 RBs, $m_{SRS,B_{SRS}}/8$ RBs, $5m_{SRS,B_{SRS}}/8$ RBs and $7m_{SRS,B_{SRS}}/8$ RBs, respectively.

In some embodiments, the one or more messages may comprise RRC signaling. The RRC signaling comprises a first information element (IE) and a second IE configured in SRS-Resource, and the first IE configures the partial frequency sounding indicator $P_F$ and the second IE configures the partial frequency sounding offset.

In some embodiments, the first IE is SubbandReduction-r17 ENUMERATED {2, 3, 4, 8}. In some variants the second IE is PartialSubbandOffset-r17 INTEGER (0.7).

In some embodiments, two IEs may be configured as the highlighted part below:

```
SRS-Resource ::= SEQUENCE {
srs-ResourceId SRS-ResourceId,
nrofSRS-Ports ENUMERATED {port1, ports2, ports4},
ptrs-PortIndex ENUMERATED {n0, n1 } OPTIONAL, -- Need R
transmissionComb CHOICE {
n2 SEQUENCE {
combOffset-n2 INTEGER (0..1),
cyclicShift-n2 INTEGER (0..7)
},
n4 SEQUENCE {
combOffset-n4 INTEGER (0..3),
cyclicShift-n4 INTEGER (0..11)
```

```
}
},
resourceMapping SEQUENCE {
startPosition INTEGER (0..5),
nrofSymbols ENUMERATED {n1, n2, n4},
repetitionFactor ENUMERATED {n1, n2, n4}
},
SubbandReduction-r17      ENUMERATED {2, 3, 4, 8},
PartialSubbandOffset-r17  INTEGER (0..7),
```

In some embodiments, dynamic indication of $P_F$ and the partial frequency sounding offset can be achieved by indicated in downlink control information (DCI), for DCI Format 0_1, 0_2, 1_1, 1_2, 2_3.

In some implementations, the one or more messages may further comprise DCI, and the DCI comprises a bit field configured to activate or deactivate the partial frequency sounding indicator $P_F$ and the partial frequency sounding offset. Exemplarily, a new 1-bit field is introduced that indicates whether $P_F$ and the partial frequency sounding offset having been configured in SRS-Resource should be applied.

In some variants, the one or more messages comprise DCI, and a bit width of SRS request field of the DCI is increased to configure the partial frequency sounding indicator $P_F$ and the partial frequency sounding offset. Exemplarily, the SRS request field bit width can be increased, the increased bit width is used to indicate whether $P_F$ should be applied, and the offset.

In some variants, the one or more messages comprise DCI, and one or multiple new fields can be introduced in the DCI to configure the partial frequency sounding indicator $P_F$ and the partial frequency sounding offset.

In some embodiments, the one or more messages may comprise at least one MAC-CE, and the at least one MAC-CE configures the partial frequency sounding indicator $P_F$ and the partial frequency sounding offset. MAC-CE is the media access control (MAC) control element sent from BS to the UE BS schedules DL data to the UE and sends the DL data in physical downlink shared channel (PDSCH). BS also may append some MAC layer information in the PDSCH, among which there is MAC-CE. Exemplarily. BS may transmit PDSCH to UE and PDSCH can carry DL data. MAC-CE or both.

In some implementations, each MAC-CE comprises a corresponding SRS-ResourceSetId, and each MAC-CE configures the partial frequency sounding indicator $P_F$ of all SRS-Resources indicated by the corresponding SRS-ResourceSetId with a first value, and each MAC-CE configures the partial frequency sounding offset of all SRS-Resources indicated by the corresponding SRS-ResourceSetId with a second value. In some variants. MAC-CE can be configured to apply the $P_F$ and the partial frequency sounding offset per SRS-ResourceSet. Exemplarily. MAC-CE will contain SRS-ResourceSetId, so that MAC-CE can be used to change all SRS-Resource in the indicated SRS-ResourceSetId with the same value.

SRS-ResourceSetId. and each In some implementations, each MAC-CE comprises a corresponding MAC-CE configures the partial frequency sounding indicator $P_F$ and the partial frequency sounding offset of all SRS-Resources indicated by the corresponding SRS-ResourceSetId independently. In some variants, MAC-CE can be configured to apply the $P_F$ and the partial frequency sounding offset per SRS-Resource in a SRS-ResourceSet. Exemplarily, MAC-CE will contain SRS-ResourceId. Furthermore, the MAC-CE can update each SRS-Resource in the indicated SRS-ResourceSet independently.

In some implementations, each MAC-CE comprises a corresponding SRS-ResourceId, and each MAC-CE configures the partial frequency sounding indicator $P_F$ and the partial frequency sounding offset of an SRS-Resource based on the corresponding SRS-ResourceId. In some variants. MAC-CE can be configured to apply the $P_F$ and the partial frequency sounding offset per SRS-Resource. Exemplarily, MAC-CE will contain SRS-ResourceId, so that MAC-CE can be used to change each SRS-Resource independently.

Overall, the technical advantage of configuring $P_F$ and partial frequency sounding offset through DCI or MAC-CE is that it can be achieved faster and more dynamic than it is configured by RRC SRS-Resource.

In some embodiments, the additional information may further comprise a nrofSymbols and a repetitionFactor. and the SRS resource allocation indicates at least one first subset of nrofSymbols symbols in the first slot, each first subset in the first slot having repetitionFactor symbols. The nrofSymbols represents the number of consecutive SRS symbols can be configured for SRS transmission. The repetitionFactor is used for SRS frequency hopping configuration, i.e., frequency location of SRS hops every repetitionFactor SRS symbols. In some variants, different subsets can be configured. e.g., each subset comprises repetitionFactor SRS symbols.

In some embodiments, when $P_F$ is configured, one or more properties relating to the SRS transmission hops within each first subset in the first slot. In some embodiments, partial frequency sounding offset can be different for different SRS symbols, i.e., partial frequency sounding offset hopping. Exemplarily, partial frequency sounding offset hopping can be allowed within the same frequency hopping repetition, for example, repetitionFactor symbols.

Figure 5:
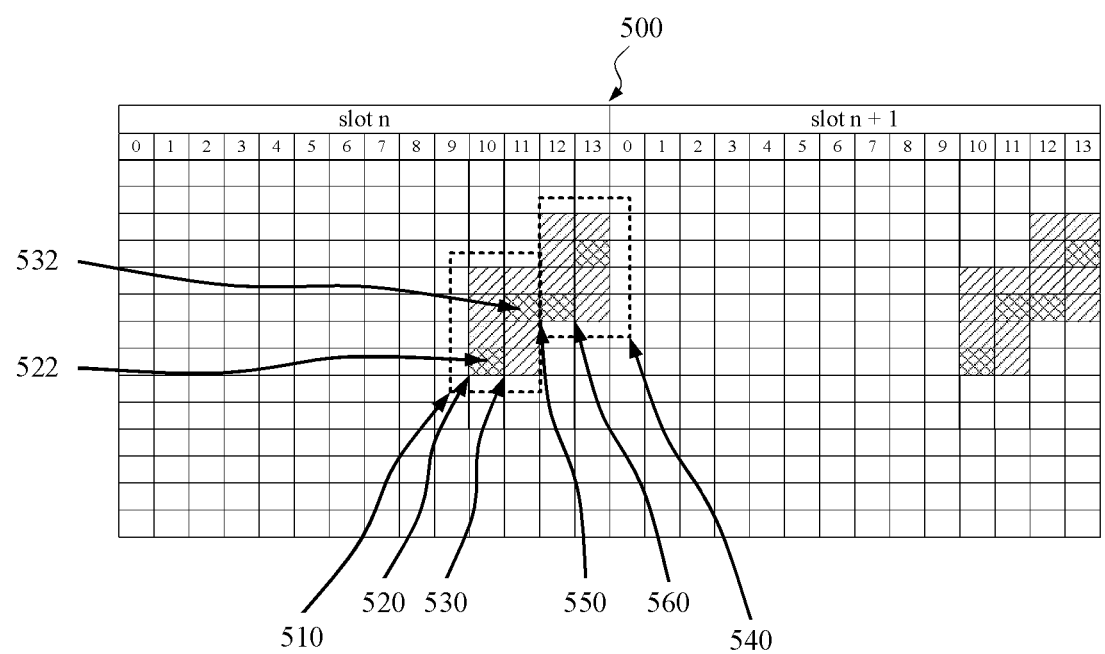
FIG. 5 illustrates an exemplary SRS configuration with offset hopping in accordance with some embodiments.

FIG. 5 illustrates an exemplary SRS configuration with offset hopping in accordance with some embodiments. As shown in FIG. 5, the nrofSymbols for SRS transmission in this embodiment is 4 consecutive symbols, i.e., col 10 to col 13, in the first slot (slot n). Similarly, SRS transmission in the second slot (slot n+1) also contains nrofSymbols symbols. i.e., 4 consecutive symbols from col 10 to col 13 in the slot n+1. The SRS resource allocation 500 indicates two first subsets of 4 SRS symbols in the slot n, that is, first subset 510 and first subset 540. First subset 510 comprise SRS symbol 520 and 530. Another first subset 540 comprises SRS symbol 550 and 560. In some embodiments, when repetitionFactor is configured, for example, repetitionFactor=2, the frequency of SRS symbol 550 in the first subset 540 hops with respect to SRS symbol 520 in the first subset 510. Similarly, the frequency of SRS symbol 560 in the first subset 540 hops with respect to SRS symbol 530 in the first subset 510.

In some embodiments, when $P_F$ is configured, for example, $P_F$=4, then SRS symbol 520 can be divided into 4 groups of contiguous RBs and each group contains $m_{SRS,B_{SRS}}/4$ RBs, as a result of $P_F$ configuration. The partial subband 522 represents one group of contiguous RBs. i.e., $m_{SRS,B_{SRS}}/4$ RBs.

In some embodiments, partial frequency sounding offset can be different for different SRS symbols. Exemplarily, the offset of partial subband 532 hops with respect to the offset of partial subband 522 within the first subset 510.

In some embodiments, the at least one first subset of the nrofSymbols symbols in the first slot comprises two or more first subsets, and one or more properties relating to the SRS transmission hops between different first subsets in the first slot. Exemplary, partial frequency sounding offset hopping can be allowed in crossing different frequency hopping repetition symbols, for example, repetitionFactor, in the same slot.

Figure 6:
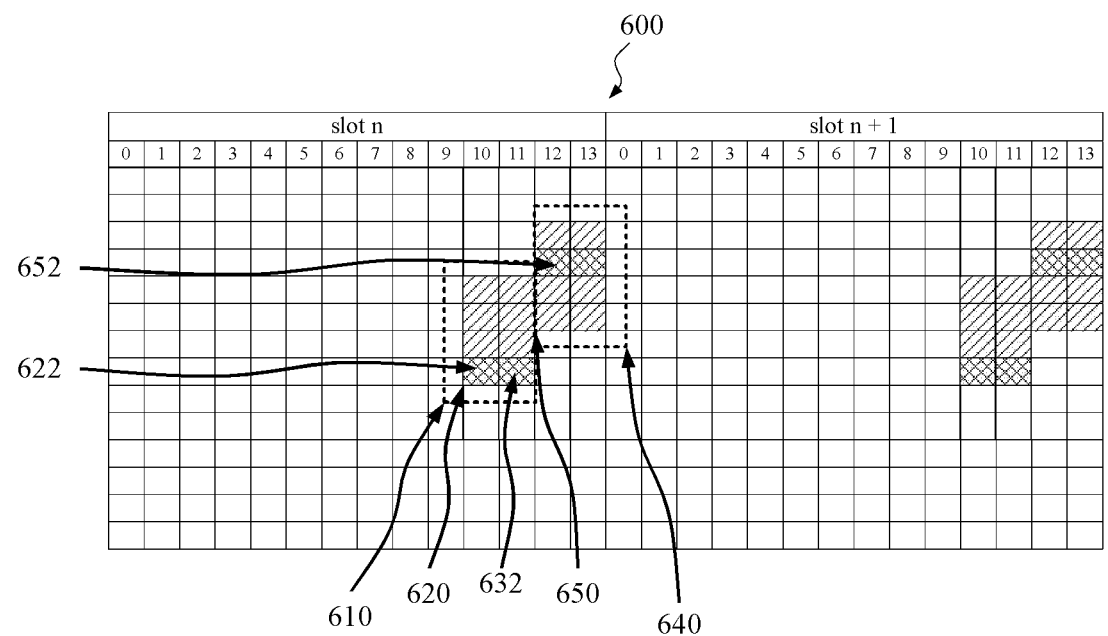
FIG. 6 illustrates another exemplary SRS configuration with offset hopping in accordance with some embodiments.

FIG. 6 illustrates another exemplary SRS configuration with offset hopping in accordance with some embodiments. In FIG. 6, similar reference numerals denote similar components and will not be repeated here.

Referring to FIG. 6, the SRS resource allocation 600 indicates 4 SRS symbols in the first slot SRS resource allocation 600 also indicates two first subsets, first subset 610 and first subset 640, each subset contains two SRS symbols.

In some embodiments, partial frequency sounding offset can be implemented across different subsets in the same slot. As shown in FIG. 6, the partial frequency sounding offset of partial subband 652 in first subset 640 hops with respect to the partial frequency sounding offset of partial subband 622 in first subset 610. It should be noted that in comparison with the case where the partial frequency sounding offset hops within the same subset (e.g., as shown in FIG. 5 the offset of 532 hops with respect to 522 in the same subset 510), the partial frequency sounding offset in FIG. 6 does not hop within the same subset. For example, the partial frequency sounding offset of partial subband 632 does not hop with respect to the partial frequency sounding offset of partial subband 622.

In some embodiments, the SRS resource allocation indicates at least one second subset of nrofSymbols symbols in a second slot, each second subset in the second slot having repetitionFactor symbols, and one or more properties relating to the SRS transmission hops between the at least one first subset in the first slot and the at least one second subset in the second slot. Exemplarily, the partial frequency sounding offset hopping can be allowed in crossing different frequency hopping repetition, for example, repetitionFactor, in different slots.

Figure 7:
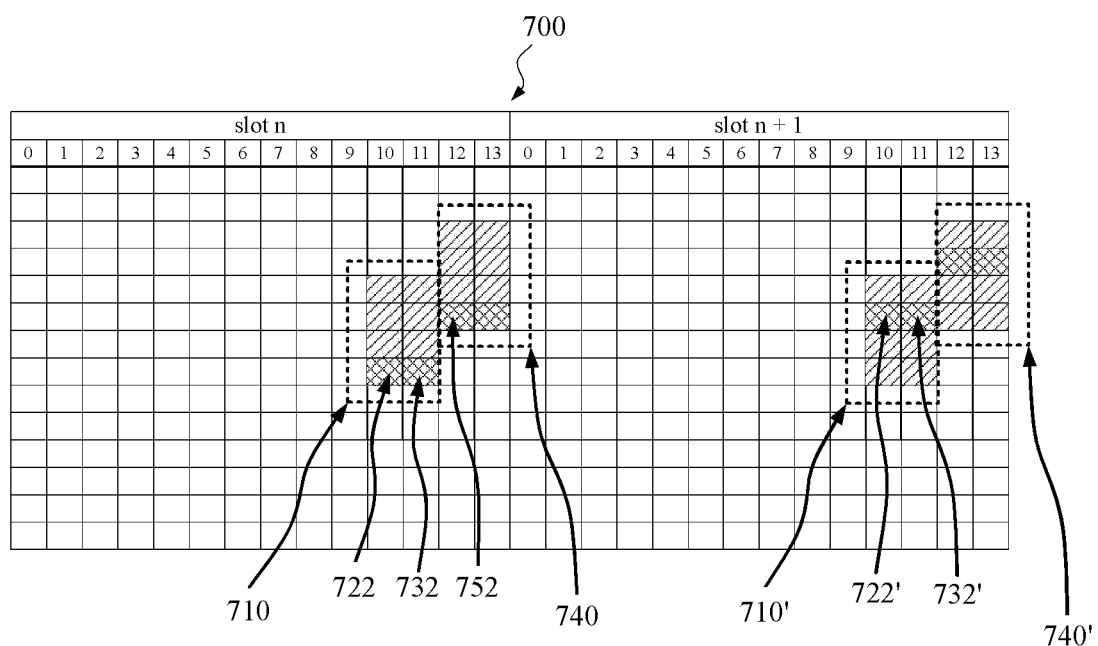
FIG. 7 illustrates yet another exemplary SRS configuration with offset hopping in accordance with some embodiments.

FIG. 7 illustrates yet another exemplary SRS configuration with offset hopping in accordance with some embodiments. In FIG. 7, similar reference numerals denote similar components and will not be repeated here.

Referring to FIG. 7, the SRS resource allocation 700 indicates 4 SRS symbols that are divided into two first subset, first subset 710 and first subset 710 in the first slot (slot n). SRS resource allocation 700 also indicates 4 SRS symbols that are divided into two second subsets, second subset 710' and second subset 740' in the second slot (slot n+1).

In some embodiments, partial frequency sounding offset can be implemented across different subsets in different slots. As shown in FIG. 7, the partial frequency sounding offset of partial subband 722' in second subset 710' hops with respect to the partial frequency sounding offset of partial subband 722 in first subset 710 (hopping across slot n and slot n+1). Similarly, the partial frequency sounding offset of partial subband 732' in second subset 710' hops with respect to the partial frequency sounding offset of partial subband 732 in first subset 710. It should be noted that in comparison with the case where the partial frequency sounding offset hops within the same subset (e.g., as shown in FIG. 5 the offset of 532 hops with respect to 522 in the same subset 510), the partial frequency sounding offset in FIG. 7 does not hop within the same subset. For example, the partial frequency sounding offset of partial subband 732 does not hop with respect to the partial frequency sounding offset of partial subband 722. It also should be noted that in comparison with the case where the partial frequency sounding offset hops across different subsets in the same slot (e.g., as shown in FIG. 6 the offset of 652 in first subset 640 hops with respect to the offset of 622 in first subset 610), the partial frequency sounding offset in FIG. 7 does not hop within the same slot. For example, the partial frequency sounding offset of partial subband 752 does not hop with respect to the partial frequency sounding offset of partial subband 722 in the first slot.

It should be understood that while the hopping mechanism illustrated in FIG. 5 to FIG. 7 mentioned partial frequency sounding offset hopping, other properties or parameters hopping in each of these cases illustrated above may also be possible.

In some implementations, the one or more properties comprise at least one property selected from a group consisting of the partial frequency sounding offset. SRS sequence, cyclic shift, spatial relation, pathloss RS (PLRS), close loop power control (CLPC) and open loop power control (OLPC). In some variants, when more than one SRS symbol is configured for SRS transmission, within the same SRS transmission, one or multiple of the properties can be independently configured for each subsets of SRS symbols. In some variants, for periodic or semi-persistent SRS, i.e., P-SRS or SP-SRS, across different periodicity, one or multiple of the properties can be independently configured for SRS transmission (e.g., for periodic SRS with 20 ms periodicity, it can be configured independently every 20 ms with certain repeated pattern).

In some embodiments, when UE transmits SRS symbols multiple times, UE can use a different SRS sequence in each one or multiple SRS symbols. Exemplarily, this can be achieved by different sequence itself, or cyclic shift of the same sequence.

In some embodiments, when UE transmits SRS symbols multiple times, UE can use different subsets of SRS symbols to different transmission and reception point (TRP). Exemplarily, different TRPs may need different spatial relation (beam). PLRS, OLPC and/or CLPC.

Overall, the above-mentioned sequence hopping and TRS hopping are able to enhance SRS coverage.

In some embodiments, SRS partial sounding can be configured for UE to skip some of the subband transmission. Exemplarily, the SRS transmission within a part of the at least one first subset of the nrofSymbols symbols is skipped.

Figure 8:
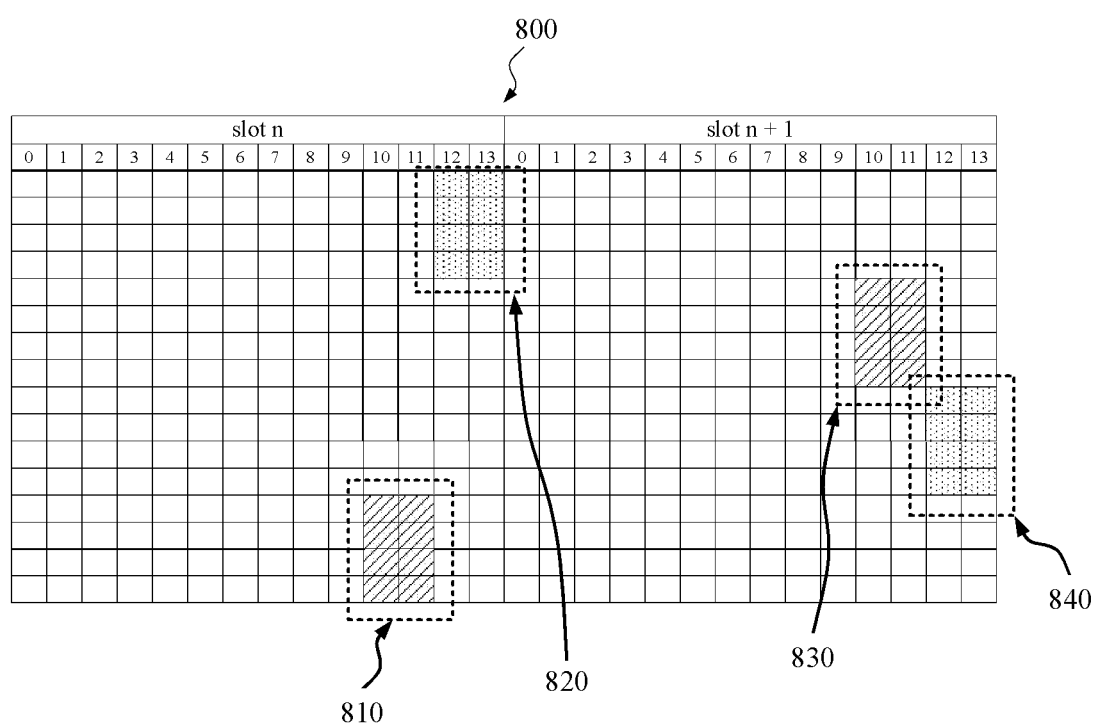
FIG. 8 illustrates an exemplary SRS configuration with skipping mechanism in accordance with some embodiments.

FIG. 8 illustrates an exemplary SRS configuration with skipping mechanism in accordance with some embodiments. As shown in FIG. 8. SRS configuration allocation 800 indicates two subsets, first subsets 810 and 820, of 4 SRS symbols in slot n and another two subsets, second subsets 830 and 840, of 4 SRS symbols in slot n+1. In some embodiments. SRS transmission within first subset 820 may be skipped. Similarly, SRS transmission within second subset 840 may be skipped UE might be able to boost the SRS transmission power when some SRS transmissions (first subset 820 and second subset 840) are skipped.

In some embodiments, due to the minimum length of SRS sequence, the minimum subband size of $m_{SRS,B_{SRS}}$ is further restricted compared to existing NR (currently, it is 4 RBs). Minimum subband size of $m_{SRS,B_{SRS}}$ is a function of $P_F$, SRS comb size $K_{TC}$ (currently, 1/2/4/8) and minimum SRS sequence length (currently $N_{SRS}^{min}$=6).

In some implementations, the additional information further comprises an SRS comb size $K_{TC}$ and a minimum SRS sequence length $N_{SRS}^{min}$, a minimum length of the subband size $m_{SRS,B_{SRS}}^{min}$=max$\{N_{SRS}^{min}P_F K_{TC}/12, 4\}$. $P_F$ represents the partial frequency sounding indicator. In these embodiments, UE cannot configure $m_{SRS,B_{SRS}} < m_{SRS,B_{SRS}}^{min}$.

In some embodiments, configuration or indication of $P_F$ can be allowed in the case selected from a group consisting of only when SRS is configured with frequency hopping, only when SRS is configured without frequency hopping and both when SRS is configured with and without frequency hopping.

In some embodiments, the maximum number of repetition symbols in one slot and one SRS resource is increased to S and support at least one S value from {8, 10, 12, 14}.

In some embodiments, the value of S may be configured as the highlighted part below.

```
SRS-Resource ::= SEQUENCE {
  srs-ResourceId SRS-ResourceId,
  nrofSRS-Ports ENUMERATED {port1, ports2, ports4},
  ptrs-PortIndex ENUMERATED {n0, n1 } OPTIONAL, -- Need R
  transmissionComb CHOICE {
    n2 SEQUENCE {
      combOffset-n2 INTEGER (0..1),
      cyclicShift-n2 INTEGER (0..7)
    },
    n4 SEQUENCE {
      combOffset-n4 INTEGER (0..3),
      cyclicShift-n4 INTEGER (0..11)
    }
  },
  resourceMapping SEQUENCE {
    startPosition INTEGER (0..5),
    nrofSymbols ENUMERATED {n1, n2, n4, n8, n10, n12, n14},
    repetitionFactor ENUMERATED {n1, n2, n4}
  },
  ...
```

In some embodiments, the configuration of more than 4 SRS symbols for SRS transmission may be implemented by at least one option selected from a group consisting of: RRC configured (option 1), use MAC-CE to change the number of SRS symbols per SRS resource or per SRS resource set (option 2) and use DCI that triggers AP-SRS to change the number of SRS symbols. e.g., scaling factor (1, 2, 3) can be introduced (option 3).

In some embodiments, SRS configuration may support SRS repetition with more than 4 symbols and more repetitionFactor may be supported in the specification. In some embodiments, repetitionFactor may include n3, n5, n6, n7, n8, n10, n12 and n14. In some variants, for S=8: repetitionFactor n8; for S=10: repetitionFactor n5, n10: for S=12: repetitionFactor n3, n6, n12; for S=14: repetitionFactor n7, n14. Exemplarily, reptitionFactor may be configured as reptitionFactor-r17 ENUMERATED {n1, n2, n3, n4, n5, n6, n7, n8, n10, n12, n14}.

In some embodiments, to support SRS repetition with more than 4 symbols, repetitionFactor is fixed to be the same as nrofSymbols, i.e., no intra-slot frequency hopping is allowed.

In some embodiments, to support SRS repetition with more than 4 symbols, the starting SRS symbol location is configured as startPosition and the number of SRS symbols is configured as nrofSymbols. In some variants, if some symbols exceed the slot boundary, UE may only transmit the SRS symbols in SRS resources within the slot and omits the SRS symbols exceeding the slot boundary. Optionally, UE may not transmit the whole SRS resources. Optionally, UE may still transmit the whole SRS resource. In some implementations, specification may describe the UE behavior, i.e., skip some of the subband transmission.

In some embodiments, when more than 4 consecutive SRS symbols are configured and one or multiple SRS symbol conflicts with the downlink (DL) symbols due to either semi-statically configured DL symbols, dynamic configured DL symbols via DCI Format 2_0 or dynamic configured DL symbols for CSI-RS or PDSCH reception, UE may terminate the SRS transmission at the first conflicting symbol, i.e., UE will not transmit on the conflicting symbol as well as on the symbols afterwards. Alternatively, UE may cancel the SRS transmission on the conflicting symbols, but resumes SRS transmission afterwards. In some implementations, specification will define the UE behavior. i.e., which SRS symbols that UE needs to omit.

In some embodiments, to support the 4T6R SRS antenna switching, the SRS configuration may use two configuration options. In some implementations, the SRS configuration may use configuration option 1, that is, configure at least one SRS resource set, total two SRS resources and one SRS resource with 4 port and one SRS resource with 2 port. In some variants, the SRS configuration may use configuration option 2, that is, configure at least one SRS resource set, total three SRS resources and each SRS resource with 2 port.

FIG. 9 illustrates a flowchart for an exemplary method 900 by a BS. As shown in FIG. 9, the method 900 by BS includes step 910 to 920.

In step 910. BS sending one or more messages comprising SRS configuration information to a user equipment (UE), the SRS configuration information comprises a partial frequency sounding indicator and additional information associated with the partial frequency sounding indicator, and determines SRS resource allocation.

In step 920, BS receiving an SRS from the UE in accordance with the SRS configuration information.

Figure 10:
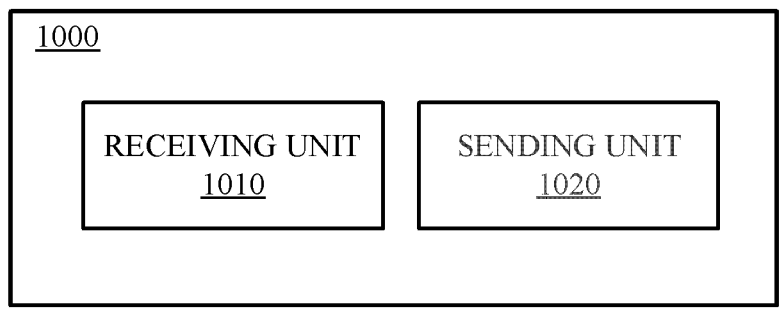
FIG. 10 illustrates an exemplary block diagram of an apparatus for a UE in accordance with some embodiments.

FIG. 10 illustrates an exemplary block diagram of an apparatus 1000 for a UE in accordance with some embodiments. The apparatus 1000 illustrated in FIG. 10 may be used to implement the method 200 as illustrated in combination with FIG. 2.

As shown in FIG. 10, the apparatus 1000 includes receiving unit 1010 and sending unit 1020.

The receiving unit 1010 may be configured to receive one or more messages comprising sounding reference signal (SRS) configuration information from a base station (BS), the SRS configuration information comprises a partial frequency sounding indicator and additional information associated with the partial frequency sounding indicator, and determines SRS resource allocation.

The sending unit 1020 may be configured to send an SRS to the BS in accordance with the SRS configuration information.

Figure 11:
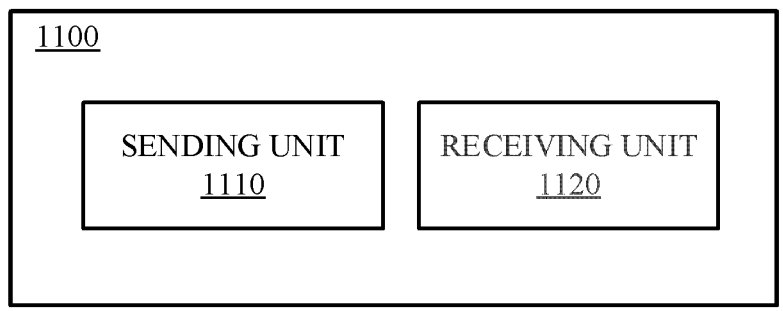
FIG. 11 illustrates an exemplary block diagram of an apparatus for a BS in accordance with same embodiments.

FIG. 11 illustrates an exemplary block diagram of an apparatus 1100 for a BS in accordance with some embodiments. The apparatus 1100 illustrated in FIG. 11 may be used to implement the method 9X) as illustrated in combination with FIG. 9.

As shown in FIG. 11, the apparatus 1100 includes sending unit 1110 and receiving unit 1120.

The sending unit 1110 may be configured to send one or more messages comprising SRS configuration information to a user equipment (UE), the SRS configuration information comprises a partial frequency sounding indicator and additional information associated with the partial frequency sounding indicator, and determines SRS resource allocation.

The receiving unit 1120 may be configured to receive an SRS from the UE in accordance with the SRS configuration information.

Figure 12:
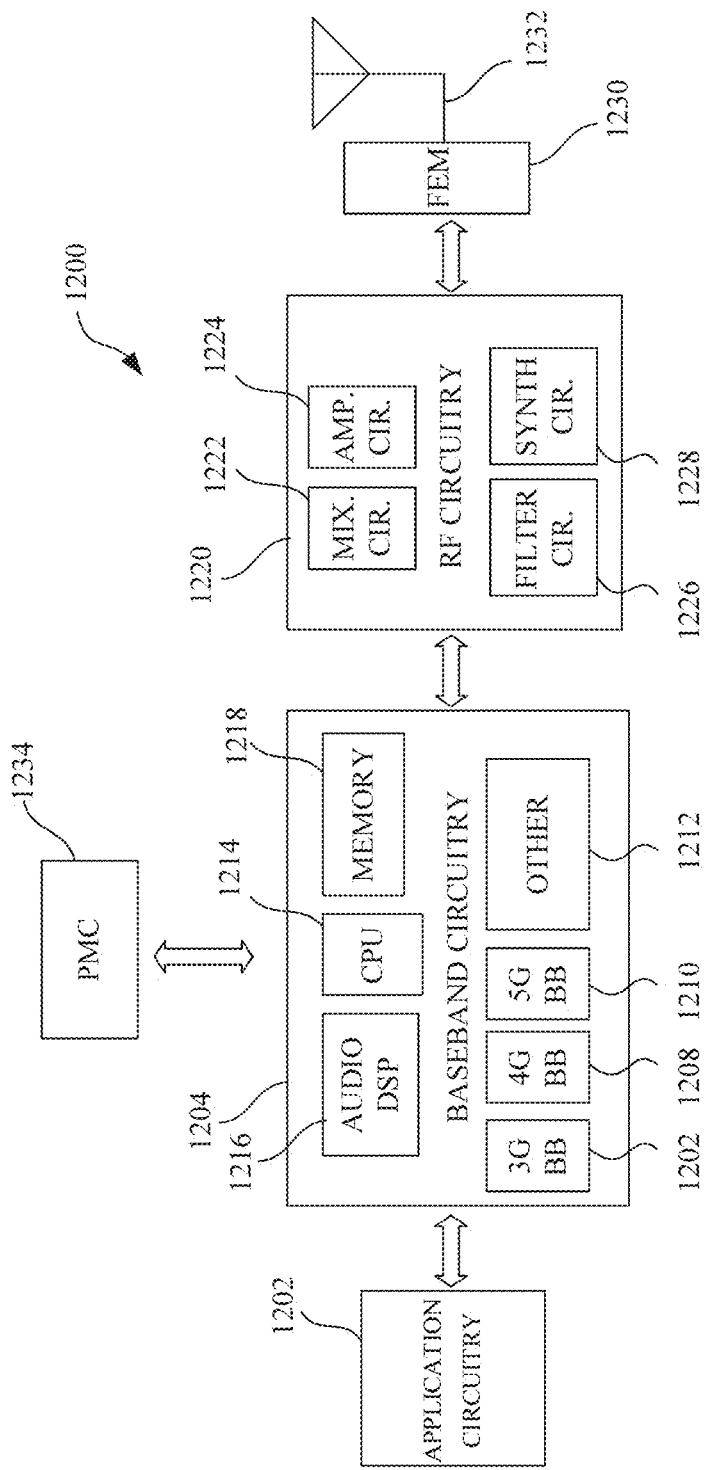
FIG. 12 illustrates example components of a device 1200 in accordance with some embodiments.

FIG. 12 illustrates example components of a device 1200 in accordance with some embodiments In some embodiments, the device 1200 may include application circuitry 1202, baseband circuitry 1204. Radio Frequency (RF) circuitry (shown as RF circuitry 1220), front-end module (FEM) circuitry (shown as FEM circuitry 1230), one or more antennas 1232, and power management circuitry (PMC) (shown as PMC 1234) coupled together at least as shown. The components of the illustrated device 1200 may be included in a UE or a RAN node. In some embodiments, the device 1200 may include fewer elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1220 and to generate baseband signals for a transmit signal path of the RF circuitry 1220. The baseband circuitry 1204 may interface with the application circuitry 1202 for generation and processing of the baseband signals and for controlling operations of the RF circuitry 1220. For example, in some embodiments, the baseband circuitry 1204 may include a third generation (3G) baseband processor (3G baseband processor 1206), a fourth generation (4G) baseband processor (4G baseband processor 1208), a fifth generation (5G) baseband processor (5G baseband processor 1210), or other baseband processor(s) 1212 for other existing generations, generations in development or to be developed in the future (e.g., second generation (2G), sixth generation (6G), etc.). The baseband circuitry 1204 (e.g., one or more of baseband processors) may handle various radio control functions that enable communication with one or more radio networks via the RF circuitry 1220. In other embodiments, some or all of the functionality of the illustrated baseband processors may be included in modules stored in the memory 1218 and executed via a Central Processing Unit (CPU 1214). The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo. Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include a digital signal processor (DSP), such as one or more audio DSP(s) 1216. The one or more audio DSP(s) 1216 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1204 is configured to support radio communications of more than one wireless protocol may be referred to as multi-mode baseband circuitry.

The RF circuitry 1220 may enable communication with wireless networks using modulated electromagnetic radiation through a non-solid medium. In various embodiments, the RF circuitry 1220 may include switches, filters, amplifiers, etc. to facilitate the communication with the wireless network. The RF circuitry 1220 may include a receive signal path which may include circuitry to down-convert RF signals received from the FEM circuitry 1230 and provide baseband signals to the baseband circuitry 1204. The RF circuitry 1220 may also include a transmit signal path which may include circuitry to up-convert baseband signals provided by the baseband circuitry 1204 and provide RF output signals to the FEM circuitry 1230 for transmission. [0141]

In some embodiments, the receive signal path of the RF circuitry 1220 may include mixer circuitry 1222, amplifier circuitry 1224 and filter circuitry 1226. In some embodiments, the transmit signal path of the RF circuitry 1220 may include filter circuitry 1226 and mixer circuitry 1222. The RF circuitry 1220 may also include synthesizer circuitry 1228 for synthesizing a frequency for use by the mixer circuitry 1222 of the receive signal path and the transmit signal path In some embodiments, the mixer circuitry 1222 of the receive signal path may be configured to down-convert RF signals received from the FEM circuitry 1230 based on the synthesized frequency provided by synthesizer circuitry 1228. The amplifier circuitry 1224 may be configured to amplify the down-converted signals and the filter circuitry 1226 may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, the mixer circuitry 1222 of the receive signal path may comprise passive mixers, although the scope of the embodiments is not limited in this respect.

In some embodiments, the mixer circuitry 1222 of the transmit signal path may be configured to up-convert input baseband signals based on the synthesized frequency provided by the synthesizer circuitry 1228 to generate RF output signals for the FEM circuitry 1230. The baseband signals may be provided by the baseband circuitry 1204 and may be filtered by the filter circuitry 1226.

In some embodiments, the mixer circuitry 1222 of the receive signal path and the mixer circuitry 1222 of the transmit signal path may include two or more mixers and may be arranged for quadrature downconversion and upconversion, respectively. In some embodiments, the mixer circuitry 1222 of the receive signal path and the mixer circuitry 1222 of the transmit signal path may include two or more mixers and may be arranged for image rejection (e.g., Hartley image rejection). In some embodiments, the mixer circuitry 1222 of the receive signal path and the mixer circuitry 1222 may be arranged for direct downconversion and direct upconversion, respectively. In some embodiments, the mixer circuitry 1222 of the receive signal path and the mixer circuitry 1222 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1220 may include analog-to-digital converter (ADC) and digital-to-analog converter (DAC) circuitry and the baseband circuitry 1204 may include a digital baseband interface to communicate with the RF circuitry 1220.

In some dual-mode embodiments, a separate radio IC circuitry may be provided for processing signals for each spectrum, although the scope of the embodiments is not limited in this respect.

In some embodiments, the synthesizer circuitry 1228 may be a fractional –N synthesizer or a fractional N/N+1 synthesizer, although the scope of the embodiments is not limited in this respect as other types of frequency synthesizers may be suitable. For example, synthesizer circuitry 1228 may be a delta-sigma synthesizer, a frequency multiplier, or a synthesizer comprising a phase-locked loop with a frequency divider.

The synthesizer circuitry 1228 may be configured to synthesize an output frequency for use by the mixer circuitry 1222 of the RF circuitry 1220 based on a frequency input and a divider control input In some embodiments, the synthesizer circuitry 1228 may be a fractional N/N+1 synthesizer.

In some embodiments, frequency input may be provided by a voltage controlled oscillator (VCO), although that is not a requirement. Divider control input may be provided by either the baseband circuitry 1204 or the application circuitry 1202 (such as an applications processor) depending on the desired output frequency. In some embodiments, a divider control input (e.g., N) may be determined from a look-up table based on a channel indicated by the application circuitry 1202.

Synthesizer circuitry 1228 of the RF circuitry 1220 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1228 may be configured to generate a carrier frequency as the output frequency, while in other embodiments, the output frequency may be a multiple of the carrier frequency (e g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1220 may include an IQ/polar converter.

The FEM circuitry 1230 may include a receive signal path which may include circuitry configured to operate on RF signals received from one or more antennas 1232, amplify the received signals and provide the amplified versions of the received signals to the RF circuitry 1220 for further processing. The FEM circuitry 1230 may also include a transmit signal path which may include circuitry configured to amplify signals for transmission provided by the RF circuitry 1220 for transmission by one or more of the one or more antennas 1232. In various embodiments, the amplification through the transmit or receive signal paths may be done solely in the RF circuitry 1220, solely in the FEM circuitry 1230, or in both the RF circuitry 1220 and the FEM circuitry 1230.

In some embodiments, the FEM circuitry 1230 may include a TX/RX switch to switch between transmit mode and receive mode operation. The FEM circuitry 1230 may include a receive signal path and a transmit signal path. The receive signal path of the FEM circuitry 1230 may include an LNA to amplify received RF signals and provide the amplified received RF signals as an output (e.g., to the RF circuitry 1220). The transmit signal path of the FEM circuitry 1230 may include a power amplifier (PA) to amplify input RF signals (e.g., provided by the RF circuitry 1220), and one or more filters to generate RF signals for subsequent transmission (e.g., by one or more of the one or more antennas 1232).

In some embodiments, the PMC 1234 may manage power provided to the baseband circuitry 1204. In particular, the PMC 1234 may control power-source selection, voltage scaling, battery charging, or DC-to-DC conversion. The PMC 1234 may often be included when the device 1200 is capable of being powered by a battery, for example, when the device 1200 is included in a EGE. The PMC 1234 may increase the power conversion efficiency while providing desirable implementation size and heat dissipation characteristics.

FIG. 12 shows the PMC 1234 coupled only with the baseband circuitry 1204. However, in other embodiments, the PMC 1234 may be additionally or alternatively coupled with, and perform similar power management operations for, other components such as, but not limited to, the application circuitry 1202, the RF circuitry 1220, or the FEM circuitry 1230.

In some embodiments, the PMC 1234 may control, or otherwise be part of, various power saving mechanisms of the device 1200. For example, if the device 1200 is in an RRC Connected state, where it is still connected to the RAN node as it expects to receive traffic shortly, then it may enter a state known as Discontinuous Reception Mode (DRX)

after a period of inactivity. During this state, the device 1200 may power down for brief intervals of time and thus save power.

If there is no data traffic activity for an extended period of time, then the device 1200 may transition off to an RRC Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
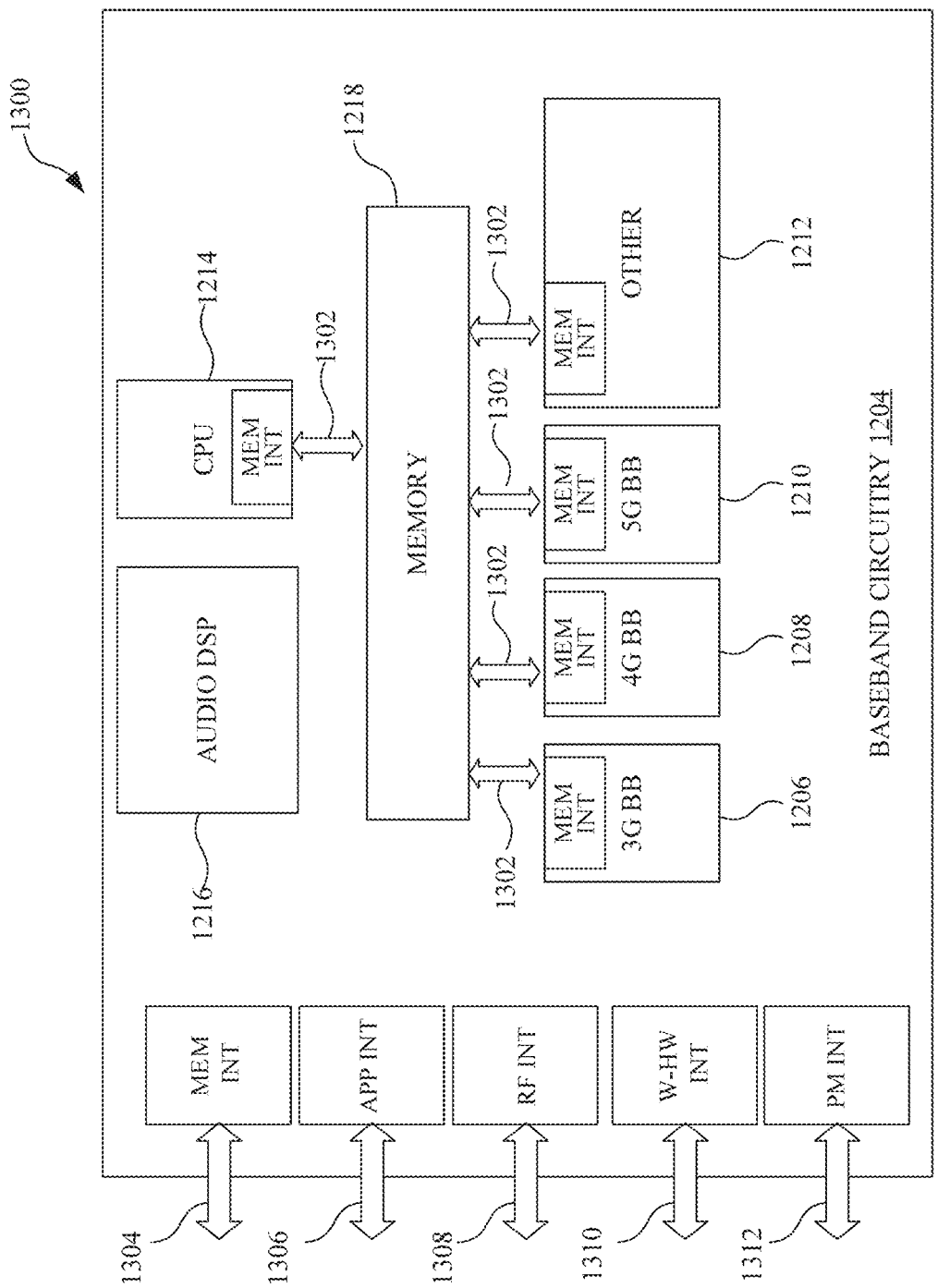
FIG. 13 illustrates example interfaces 1300 of baseband circuitry in accordance with some embodiments.

FIG. 13 illustrates example interfaces 1300 of baseband circuitry in accordance with some embodiments. As discussed above, the baseband circuitry 1204 of FIG. 12 may comprise 3G baseband processor 1206, 4G baseband processor 1208, 5G baseband processor 1210, other baseband processor(s) 1212, CPU 1214, and a memory 1318 utilized by said processors. As illustrated, each of the processors may include a respective memory interface 1302 to send/receive data to/from the memory 1318.

The baseband circuitry 1204 may further include one or more interfaces to communicatively couple to other circuitries/devices, such as a memory interface 1304 (e.g., an interface to send/receive data to/from memory external to the baseband circuitry 1204), an application circuitry interface 1306 (e.g., an interface to send/receive data to/from the application circuitry 1202 of FIG. 12), an RF circuitry interface 1308 (e.g., an interface to send/receive data to/from RF circuitry 1220 of FIG. 12), a wireless hardware connectivity interface 1310 (e.g., an interface to send/receive data to/from Near Field Communication (NFC) components, Bluetooth® components (e.g., Bluetooth® Low Energy). Wi-Fi® components, and other communication components), and a power management interface 1312 (e.g., an interface to send/receive power or control signals to/from the PMC 1234.

Figure 14:
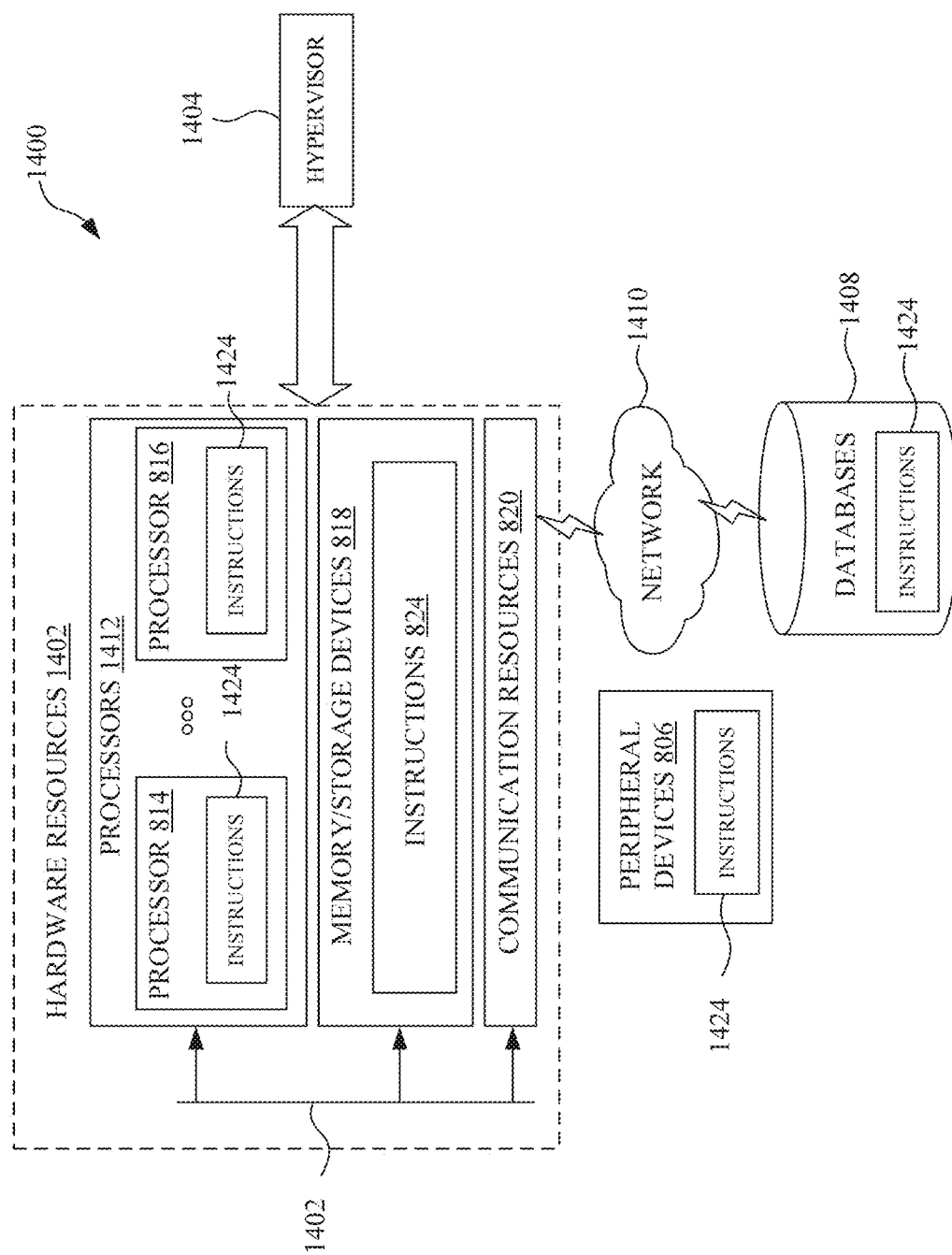
FIG. 14 illustrates components in accordance with some embodiments.

FIG. 14 is a block diagram illustrating components 1400, according to some example embodiments, able to read instructions from a machine-readable or computer-readable medium (e.g., a non-transitory machine-readable storage medium) and perform any one or more of the methodologies discussed herein. Specifically. FIG. 14 shows a diagrammatic representation of hardware resources 1402 including one or more processors 1412 (or processor cores), one or more memory/storage devices 1418, and one or more communication resources 1420, each of which may be communicatively coupled via a bus 1422. For embodiments where node virtualization (e.g., NFV) is utilized, a hypervisor 1404 may be executed to provide an execution environment for one or more network slices/sub-slices to utilize the hardware resources 1402.

The processors 1412 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1414 and a processor 1416.

The memory/storage devices 1418 may include main memory, disk storage, or any suitable combination thereof. The memory/storage devices 1418 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1420 may include interconnection or network interface components or other suitable devices to communicate with one or more peripheral devices 1406 or one or more databases 1408 via a network 1410. For example, the communication resources 1420 may include wired communication components (e.g., for coupling via a Universal Serial Bus (USB)), cellular communication components, NFC components. Bluetooth® components (e.g., Bluetooth® Low Energy). Wi-Fi® components, and other communication components.

Instructions 1424 may comprise software, a program, an application, an applet, an app, or other executable code for causing at least any of the processors 1412 to perform any one or more of the methodologies discussed herein. The instructions 1424 may reside, completely or partially, within at least one of the processors 1412 (e g., within the processor's cache memory), the memory/storage devices 1418, or any suitable combination thereof. Furthermore, any portion of the instructions 1424 may be transferred to the hardware resources 1402 from any combination of the peripheral devices 1406 or the databases 1408. Accordingly, the memory of the processors 1412, the memory/storage devices 1418, the peripheral devices 1406, and the databases 1408 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 15:
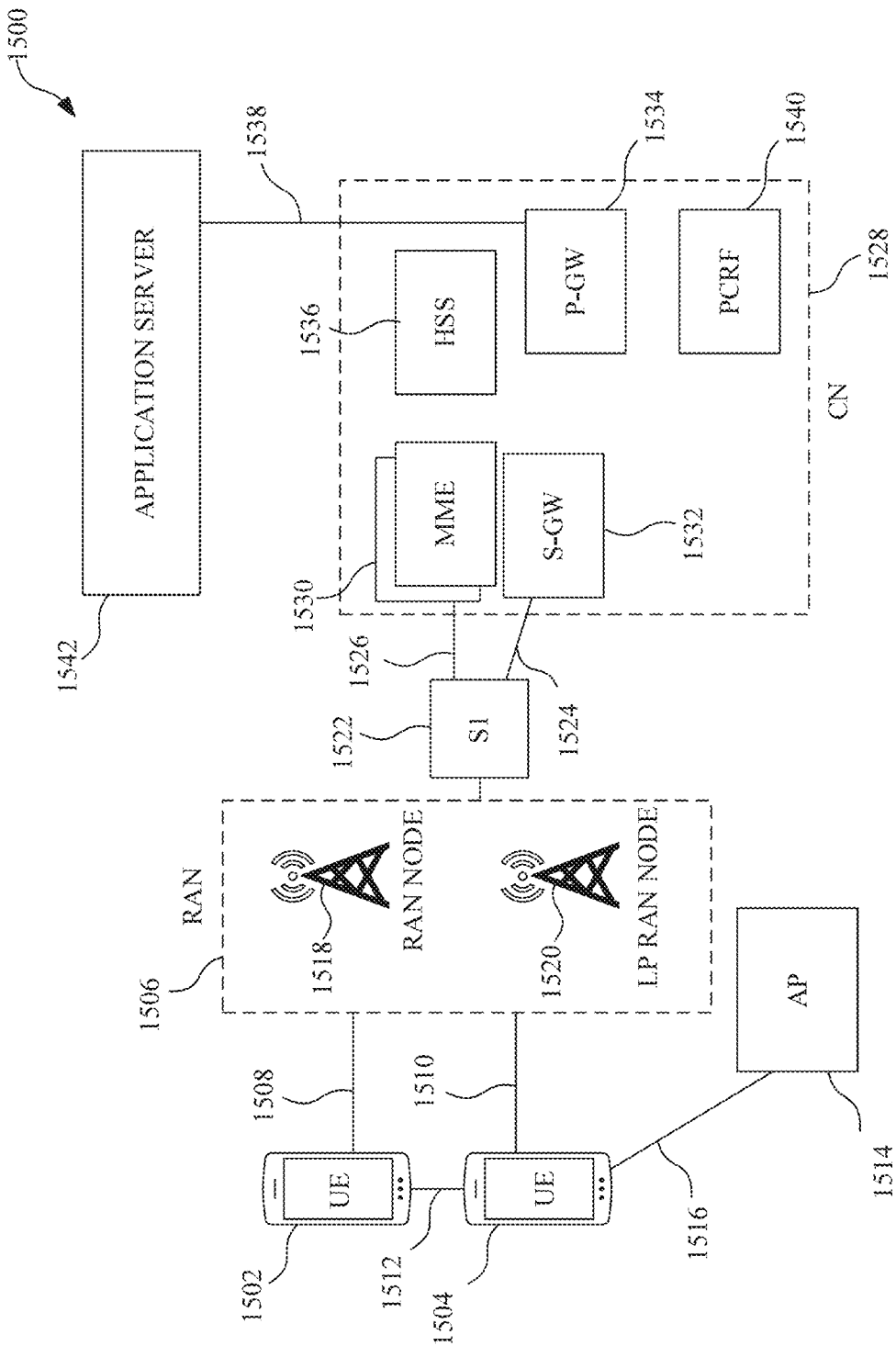
FIG. 15 illustrates an architecture of a wireless network in accordance with some embodiments.

FIG. 15 illustrates an architecture of a system 1500 of a network in accordance with some embodiments. The system 1500 includes one or more user equipment (UE), shown in this example as a UE 1502 and a UE 1504. The UE 1502 and the UE 1504 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1502 and the UE 1104 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN). Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. [0102] The UE 1502 and the UE 1504 may be configured to connect, e.g, communicatively couple, with a radio access network (RAN), shown as RAN 1506. The RAN 1506 may be, for example, an Evolved ETniversal Mobile Telecommunications System (ETMTS) Terrestrial Radio Access Network (E-UTRAN), a NextGen RAN (NG RAN), or some other type of RAN. The UE 1502 and the UE 1504 utilize connection 1508 and connection 1510, respectively, each of which comprises a physical communications interface or layer (discussed in further detail below), in this example, the connection 1508 and the connection 1510 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1502 and the UE 1504 may further directly exchange communication data via a ProSe interface 1512. The ProSe interface 1512 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1504 is shown to be configured to access an access point (AP), shown as AP 1154, via connection 1516. The connection 1516 can comprise a local wireless connection, such as a connection consistent with any IEEE 802.15 protocol, wherein the AP 1514 would comprise a wireless fidelity (WiFi®) router. In this example, the AP 1514 may be connected to the Internet without connecting to the core network of the wireless system (described in further detail below).

The RAN 1506 can include one or more access nodes that enable the connection 1508 and the connection 1510. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1506 may include one or more RAN nodes for providing macrocells, e.g., macro RAN node 1518, and one or more RAN nodes for providing femtocells or picocells (e.g., cells having smaller coverage areas, smaller user capacity, or higher bandwidth compared to macrocells), e.g., a low power (LP) RAN node such as LP RAN node 1520 [0106]. Any of the macro RAN node 1518 and the LP RAN node 1520 can terminate the air interface protocol and can be the first point of contact for the UE 1502 and the UE 1504. In some embodiments, any of the macro RAN node 1518 and the LP RAN node 1520 can fulfill various logical functions for the RAN 1506 including, but not limited to, radio network controller (RNC) functions such as radio bearer management, uplink and downlink dynamic radio resource management and data packet scheduling, and mobility management.

In accordance with some embodiments, the UE 1502 and the UE 1504 can be configured to communicate using Orthogonal Frequency-Division Multiplexing (OFDM) communication signals with each other or with any of the macro RAN node 1518 and the LP RAN node 1520 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub carriers.

In some embodiments, a downlink resource grid can be used for downlink transmissions from any of the macro RAN node 1518 and the LP RAN node 1520 to the UE 1502 and the UE 1504, while uplink transmissions can utilize similar techniques. The grid can be a time-frequency grid, called a resource grid or time-frequency resource grid, which is the physical resource in the downlink in each slot Such a time-frequency plane representation is a common practice for OFDM systems, which makes it intuitive for radio resource allocation Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1502 and the UE 1504. The physical downlink control channel (PDCCH) may carry information about the transport format and resource allocations related to the PDSCH channel, among other things. It may also inform the UE 1502 and the UE 1504 about the transport format, resource allocation, and H-ARQ (Hybrid Automatic Repeat Request) information related to the uplink shared channel. Typically, downlink scheduling (assigning control and shared channel resource blocks to the UE 1504 within a cell) may be performed at any of the macro RAN node 1518 and the LP RAN node 1520 based on channel quality information fed back from any of the UE 1502 and UE 1504. The downlink resource assignment information may be sent on the PDCCH used for (e.g., assigned to) each of the UE 1502 and the UE 1504.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with difTerent numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1506 is communicatively coupled to a core network (CN), shown as CN 1528—via an SI interface 1522. In embodiments, the CN 1528 may be an evolved packet core (EPC) network, a NextGen Packet Core (NPC) network, or some other type of CN. In this embodiment the SI interface 1522 is split into two parts: the S1-U interface 1524, which carries traffic data between the macro RAN node 1518 and the LP RAN node 1520 and a serving gateway (S-GW), shown as S-GW 1132, and an SI-mobility management entity (MME) interface, shown as SI-MME interface 1526, which is a signaling interface between the macro RAN node 1518 and LP RAN node 1520 and the MME(s) 1530. [0153] In this embodiment, the CN 1528 comprises the MME(s) 1530, the S-GW 1532, a Packet Data Network (PDN) Gateway (P-GW) (shown as P-GW 1534), and a home subscriber server (HSS) (shown as HSS 1536). The MME(s) 1530 may be similar in function to the control plane of legacy Serving General Packet Radio Service (GPRS) Support Nodes (SGSN). The MME(s) 1530 may manage mobility aspects in access such as gateway selection and tracking area list management. The HSS 1536 may comprise a database for network users, including subscription-related information to support the network entities' handling of communication sessions. The CN 1528 may comprise one or several HSS 1536, depending on the number of mobile subscribers, on the capacity of the equipment, on the organization of the network, etc. For example, the HSS 1536 can provide support for routing/roaming, authentication, authorization, naming/addressing resolution, location dependencies, etc.

The S-GW 1532 may terminate the SI interface 322 towards the RAN 1506, and routes data packets between the RAN 1506 and the CN 1528. In addition, the S-GW 1532 may be a local mobility anchor point for inter-RAN node handovers and also may provide an anchor for inter-3 GPP mobility. Other responsibilities may include lawful intercept, charging, and some policy enforcement.

The P-GW 1534 may terminate an SGi interface toward a PDN. The P-GW 1534 may route data packets between the CN 1528 (e g., an EPC network) and external networks such as a network including the application server 1542 (alternatively referred to as application function (AF)) via an Internet Protocol (I P) interface (shown as IP communications interface 1538). Generally, an application server 1542 may be an element offering applications that use IP bearer resources with the core network (e.g., ETMTS Packet Services (PS) domain, LTE PS data services, etc.). In this embodiment, the P-GW 1534 is shown to be communicatively coupled to an application server 1542 via an IP communications interface 1538. The application server 1542 can also be configured to support one or more communication services (e.g., Voice-over-Internet Protocol (VoIP) sessions, PTT sessions, group communication sessions, social networking services, etc.) for the UE 1502 and the UE 1504 via the CN 1528.

The P-GW 1534 may further be a node for policy enforcement and charging data collection. A Policy and Charging Enforcement Function (PCRF) (shown as PCRF 1540) is the policy and charging control element of the CN 1528. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a IPLMN and a Visited PCRF (V-PCRF) within a Visited Public Land Mobile Network (VPLMN). The PCRF 1541) may be communicatively coupled to the application server 1542 via the P-GW 1534. The application server 1542 may signal the PCRF 1540 to indicate a new service flow and select the appropriate Quality of Service (QoS) and charging parameters. The PCRF 1540 may provision this rule into a Policy and Charging Enforcement Function (PCEF) (not shown) with the appropriate traffic flow template (TFT) and QoS class of identifier (QCI), which commences the QoS and charging as specified by the application server 1542.

Additional Examples

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method by a user equipment (UE), comprising:
  receiving one or more messages comprising sounding
    reference signal (SRS) configuration information from a base station (BS), wherein the SRS configuration information comprises a partial frequency sounding indicator and additional information associated with the partial frequency sounding indicator, and determines SRS resource allocation; and sending a SRS to the BS in accordance with the SRS configuration information.

Example 2 is the method of example 1, wherein the additional information comprises a subband size of a SRS transmission $m_{SRS,B_{SRS}}$, and wherein the $m_{SRS,B_{SRS}}$ and the partial frequency sounding indicator determine a group of contiguous resource blocks (RBs) of the SRS transmission in a symbol in a first slot Example 3 is the method of example 2, wherein the additional information further comprises a partial frequency sounding offset and an offset basic unit of the partial frequency sounding offset, and wherein the offset basic unit and the partial frequency sounding offset determine a shift of the group of contiguous RBs in the subband of the SRS transmission in the first slot.

Example 4 is the method of example 3, wherein the number of RBs shifted by the offset basic unit equals to the number of RBs in the group of the contiguous RBs or equals to a constant value that is determined by a maximum value allowed for the partial frequency sounding indicator.

Example 5 is the method of example 3 or 4, wherein the one or more messages comprise RRC signaling, wherein the RRC signaling comprises a first information element (IE) and a second IE configured in SRS-Resource, and wherein the first IE configures the partial frequency sounding indicator and the second IE configures the partial frequency sounding offset.

Example 6 is the method of example 5, wherein the one or more messages further comprise downlink control information (DCI), and wherein the DC comprises a bit field configured to activate or deactivate the partial frequency sounding indicator and the partial frequency sounding offset.

Example 7 is the method of example 3 or 4, wherein the one or more messages comprise downlink control information (DCI), and wherein a bit width of SRS request field of the DCI is increased to configure the partial frequency sounding indicator and the partial frequency sounding offset.

Example 8 is the method of example 3 or 4, wherein the one or more messages comprise downlink control information (DCI), and wherein one or more fields are introduced in the DCI to configure the partial frequency sounding indicator and the partial frequency sounding offset.

Example 9 is the method of example 3 or 4, wherein the one or more messages comprise at least one MAC-CE, and Wherein the at least one MAC-CE configures the partial frequency sounding indicator and the partial frequency sounding offset Example 10 is the method of example 9, wherein each MAC-CE comprises a corresponding SRS-ResourceSetId, and wherein each MAC-CE configures the partial frequency sounding indicator of all SRS-Resources indicated by the corresponding SRS-ResourceSetId with a first value, and each MAC-CE configures the partial frequency sounding offset of all SRS-Resources indicated by the corresponding SRS-ResourceSetId with a second value.

Example 11 is the method of example 9, wherein each MAC-CE comprises a corresponding SRS-ResourceSetId, and wherein each MAC-CE configures the partial frequency sounding indicator and the partial frequency sounding offset of all SRS-Resources indicated by the corresponding SRS-ResourceSetId independently.

Example 12 is the method of example 9, wherein each MAC-CE comprises a corresponding SRS-ResourceId, and wherein each MAC-CE configures the partial frequency sounding indicator and the partial frequency sounding offset of a SRS-Resource based on the corresponding SRS-ResourceId.

Example 13 is the method of example 3, wherein the additional information further comprises a nrofSymbols and a repetitionFactor. and wherein the SRS resource allocation indicates at least one first subset of nrofSymbols symbols in the first slot, each first subset in the first slot having repetitionFactor symbols.

Example 14 is the method of example 13, wherein one or more properties relating to the SRS transmission hops within each first subset in the first slot.

Example 15 is the method of example 13, wherein the at least one first subset of the nrofSymbols symbols in the first slot comprises two or more first subsets, and wherein one or more properties relating to the SRS transmission hops between different first subsets in the first slot.

Example 16 is the method of example 13, wherein the SRS resource allocation indicates at least one second subset of nrofSymbols symbols in a second slot, each second subset in the second slot having repetitionFactor symbols, and wherein one or more properties relating to the SRS transmission hops between the at least one first subset in the first slot and the at least one second subset in the second slot.

Example 17 is the method according to any of examples 14-16, wherein the one or more properties comprise at least one property selected from a group consisting of the partial frequency sounding offset. SRS sequence, cyclic shift, spatial relation, pathloss RS (PLRS), close loop power control (CLPC) and open loop power control (OLPC).

Example 18 is the method of example 13, wherein the SRS transmission within a part of the at least one first subset of the nrofSymbols symbols is skipped.

Example 19 is the method according to any of examples 2-18, wherein the additional information further comprises a SRS comb size $K_{TC}$ and a minimum SRS sequence length $N_{SRS}^{min}$, wherein a minimum length of the subband size $m_{SRS,B_{SRS}}^{min}=\max\{N_{SRS}^{min}P_F K_{TC}/12, 4\}$, and wherein $P_F$ represents the partial frequency sounding indicator.

Example 20 is a method by a Base Station (BS), comprising:

sending one or more messages comprising sounding reference signal (SRS) configuration information to a user equipment (UE), wherein the SRS configuration information comprises a partial frequency sounding indicator and additional information associated with the partial frequency sounding indicator, and determines SRS resource allocation; and receiving a SRS from the UE in accordance with the SRS configuration information.

Example 21 is the method of example 20, wherein the additional information comprises a subband size of a SRS transmission $m_{SRS,B_{SRS}}$, and wherein the $m_{SRS,B_{SRS}}$ and the partial frequency sounding indicator determine a group of contiguous resource blocks (RBs) of the SRS transmission in a symbol in a first slot.

Example 22 is the method of example 21, wherein the additional information further comprises a partial frequency sounding offset and an offset basic unit of the partial frequency sounding offset, and wherein the offset basic unit and the partial frequency sounding offset determine a shift of the group of contiguous RBs in the subband of the SRS transmission in the first slot.

Example 23 is the method of example 22, wherein the number of RBs shifted by the offset basic unit equals to the number of RBs in the group of the contiguous RBs or equals to a constant value that is determined by a maximum value allowed for the partial frequency sounding indicator.

Example 24 is the method of example 22 or 23, wherein the one or more messages comprise RRC signaling, wherein the RRC signaling comprises a first information element (IE) and a second IE configured in SRS-Resource, and wherein the first IE configures the partial frequency sounding indicator and the second IE configures the partial frequency sounding offset.

Example 25 is the method of example 24, wherein the one or more messages further comprise downlink control information (DCI), and wherein the DCI comprises a bit field configured to activate or deactivate the partial frequency sounding indicator and the partial frequency sounding offset.

Example 26 is the method of example 22 or 23, wherein the one or more messages comprise downlink control information (DCI), and wherein a bit width of SRS request field of the DCI is increased to configure the partial frequency sounding indicator and the partial frequency sounding offset.

Example 27 is the method of example 22 or 23, wherein the one or more messages comprise downlink control information (DCI), and wherein one or more fields are introduced in the DCI to configure the partial frequency sounding indicator and the partial frequency sounding offset.

Example 28 is the method of example 22 or 23, wherein the one or more messages comprise at least one MAC-CE, and wherein the at least one MAC-CE configures the partial frequency sounding indicator and the partial frequency sounding offset.

Example 29 is the method of example 28, wherein each MAC-CE comprises a corresponding SRS-ResourceSetId, and wherein each MAC-CE configures the partial frequency sounding indicator of all SRS-Resources indicated by the corresponding SRS-ResourceSetId with a first value, and each MAC-CE configures the partial frequency sounding offset of all SRS-Resources indicated by the corresponding SRS-ResourceSetId with a second value.

Example 30 is the method of example 28, wherein each MAC-CE comprises a corresponding SRS-ResourceSetId. and wherein each MAC-CE configures the partial frequency sounding indicator and the partial frequency sounding offset of all SRS-Resources indicated by the corresponding SRS-ResourceSetId independently.

Example 31 is the method of example 28, wherein each MAC-CE comprises a corresponding SRS-ResourceId, and wherein each MAC-CE configures the partial frequency sounding indicator and the partial frequency sounding offset of a SRS-Resource based on the corresponding SRS-ResourceId.

Example 32 is the method of example 22, wherein the additional information further comprises a nrofSymbols and a repetitionFactor, and wherein the SRS resource allocation indicates at least one first subset of nrofSymbols symbols in the first slot, each first subset in the first slot having repetitionFactor symbols.

Example 33 is the method of example 32, wherein one or more properties relating to the SRS transmission hops within each first subset in the first slot.

Example 34 is the method of example 32, wherein the at least one first subset of the nrofSymbols symbols in the first slot comprises two or more first subsets, and wherein one or more properties relating to the SRS transmission hops between different first subsets in the first slot.

Example 35 is the method of example 32, wherein the SRS resource allocation indicates at least one second subset of nrofSymbols symbols in a second slot, each second subset in the second slot having repetitionFactor symbols, and wherein one or more properties relating to the SRS transmission hops between the at least one first subset in the first slot and the at least one second subset in the second slot.

Example 36 is the method according to any of examples 33-35, wherein the one or more properties comprise at least one property selected from a group consisting of the partial frequency sounding offset. SRS sequence, cyclic shift, spatial relation, pathloss RS (PLRS), close loop power control (CLPC) and open loop power control (OLPC).

Example 37 is the method of example 32, wherein the SRS transmission within a part of the at least one first subset of the nrofSymbols symbols is skipped.

Example 38 is the method according to any of examples 21-37, wherein the additional information further comprises a SRS comb size $K_{TC}$ and a minimum SRS sequence length $N_{SRS}^{min}$ wherein a minimum length of the subband size $m_{SRS,B_{SRS}}=\max\{N_{SRS}^{min}P_F K_{TC}/12, 4\}$, and wherein $P_F$ represents the partial frequency sounding indicator.

Example 39 is an apparatus for a user equipment (UE), the apparatus comprising:
one or more processors configured to perform steps of the method according to any of examples 1-19.

Example 40 is an apparatus for a base station (BS), the apparatus comprising:
one or more processors configured to perform steps of the method according to any of examples 20-38.

Example 41 is a computer readable medium having computer programs stored thereon which, when executed by one or more processors, cause an apparatus to perform steps of the method according to any of examples 1-38.

Example 42 is an apparatus for a communication device, comprising means for performing steps of the method according to any of examples 1-38.

Example 43 is a computer program product comprising computer programs which, when executed by one or more processors, cause an apparatus to perform steps of the method according to any of examples 1-38.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed.

Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. One or more non-transitory, computer-readable media having instructions that, when executed by one or more processors, cause a user equipment (UE) to:
   receive, from a base station, one or more messages that include sounding reference signal (SRS) configuration information to indicate an SRS resource allocation, wherein the SRS configuration information includes a partial frequency sounding indicator and additional information to indicate a size of an SRS subband;
   determine a group of contiguous resource blocks (RBs) in a symbol in a first slot based on the size of the SRS subband and the partial frequency sounding indicator; and
   cause transmission of the SRS using the group of contiguous RBs.

2. The one or more non-transitory, computer-readable media of claim 1, wherein the additional information further comprises a partial frequency sounding offset and an offset basic unit of the partial frequency sounding offset, and the instructions, when executed, further cause the UE to:
   determine a shift of the group of contiguous RBs within the SRS subband based on the offset basic unit and the partial frequency sounding offset.

3. The one or more non-transitory, computer-readable media of claim 2, wherein a first number of RBs shifted by the offset basic unit equals a second number of RBs in the group of contiguous RBs or equals a constant value that is determined by a maximum value allowed for the partial frequency sounding indicator.

4. The one or more non-transitory, computer-readable media of claim 2, wherein the one or more messages comprise RRC signaling, wherein the RRC signaling includes a first information element (IE) and a second IE configured in SRS-Resource, and wherein the first IE configures the partial frequency sounding indicator and the second IE configures the partial frequency sounding offset.

5. The one or more non-transitory, computer-readable media of claim 4, wherein the one or more messages further comprise downlink control information (DCI) that includes a bit field to activate or deactivate the partial frequency sounding indicator and the partial frequency sounding offset.

6. The one or more non-transitory, computer-readable media of claim 2, wherein the one or more messages comprise downlink control information (DCI), and wherein a bit width of an SRS request field of the DCI accommodates the partial frequency sounding indicator and the partial frequency sounding offset.

7. The one or more non-transitory, computer-readable media of claim 2, wherein the one or more messages comprise downlink control information (DCI) having one or more fields to configure the partial frequency sounding indicator and the partial frequency sounding offset.

8. The one or more non-transitory, computer-readable media of claim 2, wherein the one or more messages comprise at least one media access control (MAC) control element (CE) to configure the partial frequency sounding indicator and the partial frequency sounding offset.

9. The one or more non-transitory, computer-readable media of claim 8, wherein a first MAC CE of the at least one MAC CE comprises an SRS-ResourceSetId, and wherein the first MAC CE is to configure the partial frequency sounding indicator of all SRS-Resources indicated by the SRS-ResourceSetId with a first value, and the first MAC CE is to configure the partial frequency sounding offset of all SRS-Resources indicated by the SRS-ResourceSetId with a second value.

10. The one or more non-transitory, computer-readable media of claim 8, wherein a first MAC CE of the at least one MAC CE comprises a SRS-ResourceSetId, and wherein the first MAC CE is to configure the partial frequency sounding indicator and the partial frequency sounding offset of all SRS-Resources indicated by the SRS-ResourceSetId independently.

11. The one or more non-transitory, computer-readable media of claim 8, wherein a first MAC CE of the at least one MAC CE comprises a SRS-ResourceId, and the first MAC CE is to configure the partial frequency sounding indicator and the partial frequency sounding offset of a SRS-Resource based on the SRS-ResourceId.

12. The one or more non-transitory, computer-readable media of claim 1, wherein:
   the additional information further comprises a number of consecutive SRS symbols for the SRS resource allocation and a repetition factor to configure frequency hopping of the SRS resource allocation; and
   the number of consecutive SRS symbols is 6 and the repetition factor is 12, the number of consecutive SRS symbols is 8 and the repetition factor is 8, the number of consecutive SRS symbols is 8 and the repetition factor is 12, or the number of consecutive SRS symbols is 12 and the repetition factor is 12.

13. The one or more non-transitory, computer-readable media of claim 1, wherein:
   the additional information further comprises a repetition factor to configure frequency hopping of the SRS resource allocation; and
   the repetition factor is 6, 7, 8, 10, 12, or 14.

14. The one or more non-transitory, computer-readable media of claim 1, wherein the partial frequency sounding indicator comprises a value of 2, 3, 4, or 8.

15. A method by a Base Station (BS), comprising:
sending, to a user equipment (UE), one or more messages that include sounding reference signal (SRS) configuration information to indicate an SRS resource allocation, wherein the SRS configuration information includes a partial frequency sounding indicator and additional information to indicate a size of an SRS subband; and
receiving, from the UE, an SRS transmitted using a group of contiguous resource blocks (RBs) in a symbol in a first slot, wherein the group of contiguous RBs are determinable based on the size of the SRS subband and the partial frequency sounding indicator.

16. The method of claim 15, further comprising:
allocating a plurality of groups of contiguous RBs within the SRS subband to a respective plurality of UEs for SRS transmissions, wherein each of the plurality of groups include a same number of RBs.

17. The method of claim 15, wherein the additional information further comprises a number of consecutive SRS symbols for the SRS resource allocation and a repetition factor to configure frequency hopping of the SRS resource allocation.

18. The method of claim 17, wherein the number of consecutive SRS symbols is 6 and the repetition factor is 12, the number of consecutive SRS symbols is 8 and the repetition factor is 8, the number of consecutive SRS symbols is 8 and the repetition factor is 12, or the number of consecutive SRS symbols is 12 and the repetition factor is 12.

19. The method of claim 17, wherein the repetition factor is 6, 7, 8, 10, 12, or 14.

20. The method of claim 15, wherein the partial frequency sounding indicator comprises a value of 2, 3, 4, or 8.

* * * * *